(12) United States Patent
Kim et al.

(10) Patent No.: US 10,831,243 B2
(45) Date of Patent: Nov. 10, 2020

(54) FLEXIBLE DISPLAY DEVICE

(71) Applicant: LG ELECTRONICS INC., Seoul (KR)

(72) Inventors: Hang Seok Kim, Yongin-si (KR); Gil Jae Lee, Seongnam-si (KR); Min Chul Shin, Gunpo-si (KR); Dong Jun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/705,177

(22) Filed: Dec. 5, 2019

(65) Prior Publication Data

US 2020/0326751 A1    Oct. 15, 2020

(51) Int. Cl.
*G06F 1/16* (2006.01)

(52) U.S. Cl.
CPC .......... *G06F 1/1652* (2013.01); *G06F 1/1616* (2013.01); *G06F 1/1624* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,355,755 B2* | 1/2013 | Kim | ...................... | G06F 1/1616 455/425 |
| 9,164,547 B1* | 10/2015 | Kwon | ................... | G06F 1/1656 |
| 9,173,287 B1* | 10/2015 | Kim | ...................... | H05K 1/028 |
| 9,235,239 B2* | 1/2016 | Van Dijk | .............. | G06F 1/1652 |
| 9,535,452 B2* | 1/2017 | Ahn | ...................... | H05K 5/0017 |
| 9,603,271 B2* | 3/2017 | Lee | ......................... | G09F 9/301 |
| 10,222,835 B2* | 3/2019 | Lim | ..................... | H04M 1/0214 |
| 10,289,372 B2* | 5/2019 | Ahn | ......................... | G01B 7/30 |
| 2012/0044620 A1* | 2/2012 | Song | .................... | G06F 1/1681 361/679.01 |
| 2016/0143162 A1* | 5/2016 | Van Dijk | ............. | H05K 5/0226 361/679.01 |
| 2018/0049329 A1* | 2/2018 | Seo | ...................... | H05K 5/0017 |
| 2019/0086965 A1* | 3/2019 | Kuramochi | ........... | G06F 1/1681 |

FOREIGN PATENT DOCUMENTS

| | | |
|---|---|---|
| KR | 1020150096827 | 8/2015 |
| KR | 1020180030435 | 3/2018 |
| KR | 1020180036903 | 4/2018 |
| KR | 101911047 | 10/2018 |
| KR | 1020180138494 | 12/2018 |

OTHER PUBLICATIONS

PCT International Application No. PCT/KR2019/004374, International Search Report dated Jan. 8, 2020, 3 pages.

\* cited by examiner

*Primary Examiner* — Lisa Lea-Edmonds
(74) *Attorney, Agent, or Firm* — Lee, Hong, Degerman, Kang & Waimey

(57) ABSTRACT

A flexible display device is provided. The flexible display device according to an embodiment of the present disclosure may include a first body, a second body, a first link, and a second link. According to an embodiment of the present disclosure, in an unfolding state, the first link and the second link may not protrude out of the first body and the second body, and the first link and the second link may be changed in a form that may protect the flexible display during folding.

15 Claims, 16 Drawing Sheets

[FIG. 1A]
-- PRIOR ART --
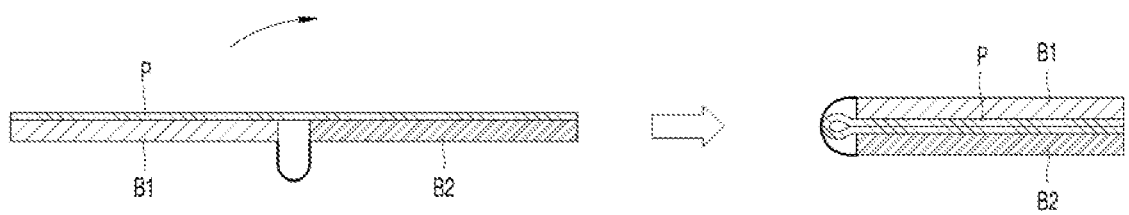

[FIG. 1B]
--PRIOR ART--
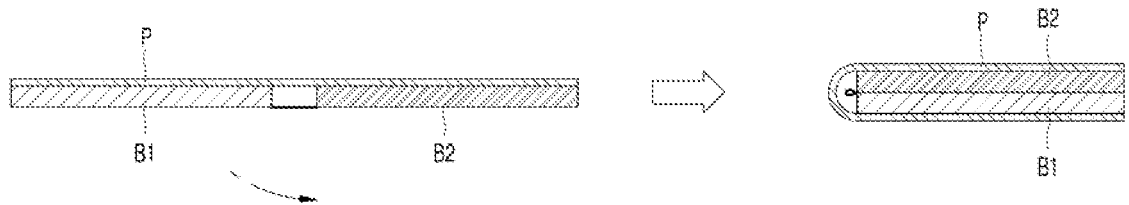

[FIG. 2]
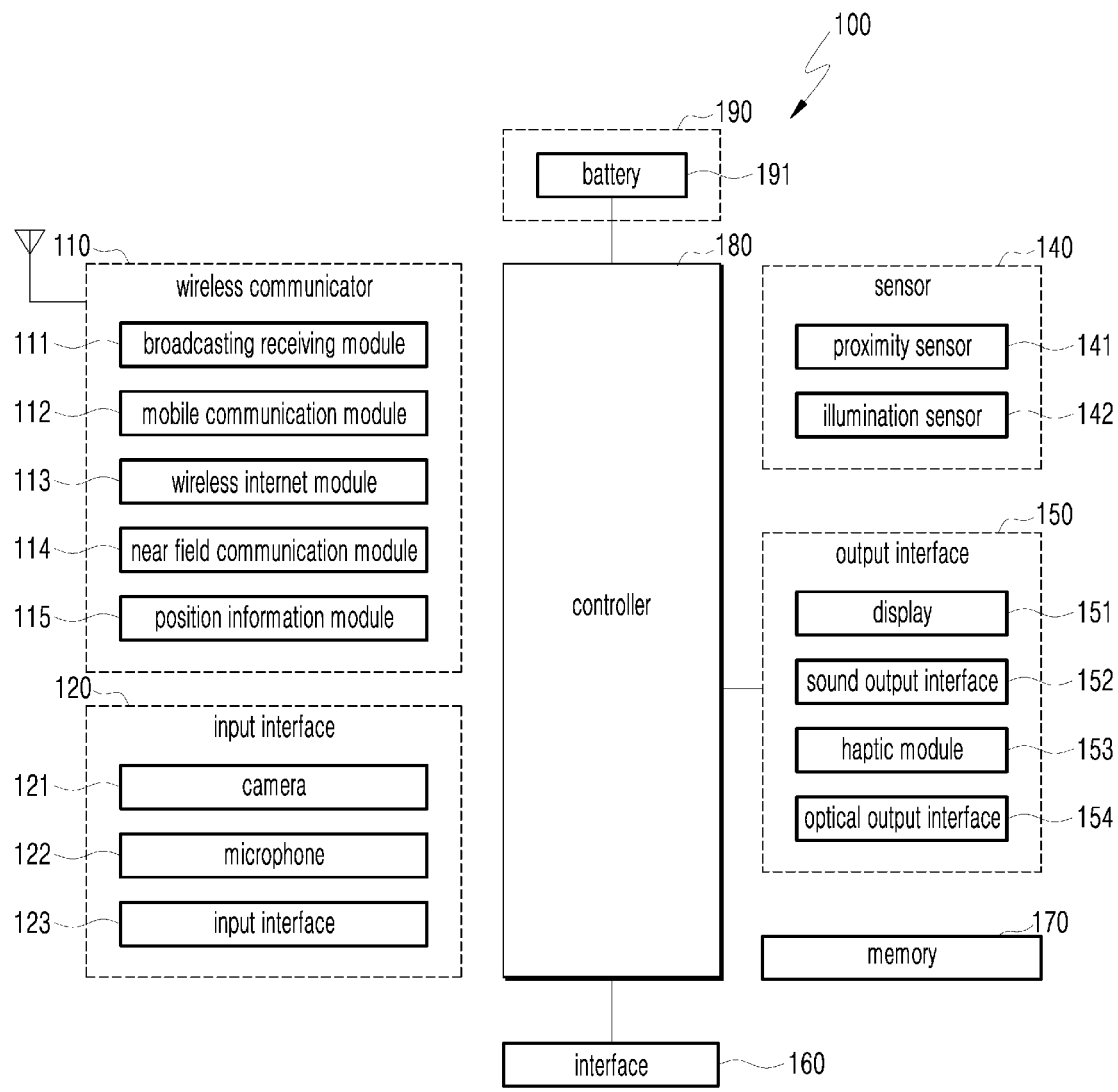

[FIG. 3A]
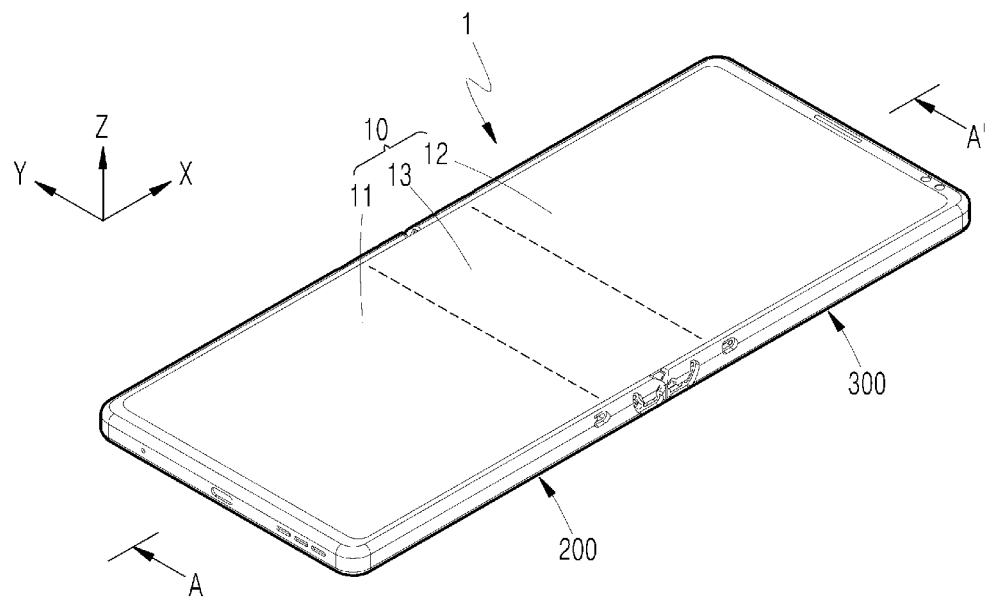
[FIG. 3B]
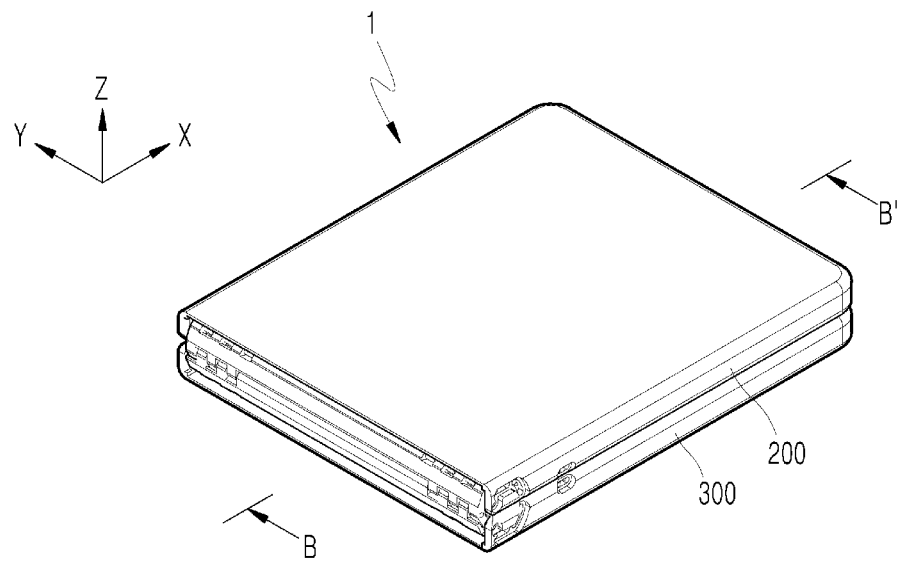

[FIG. 3C]
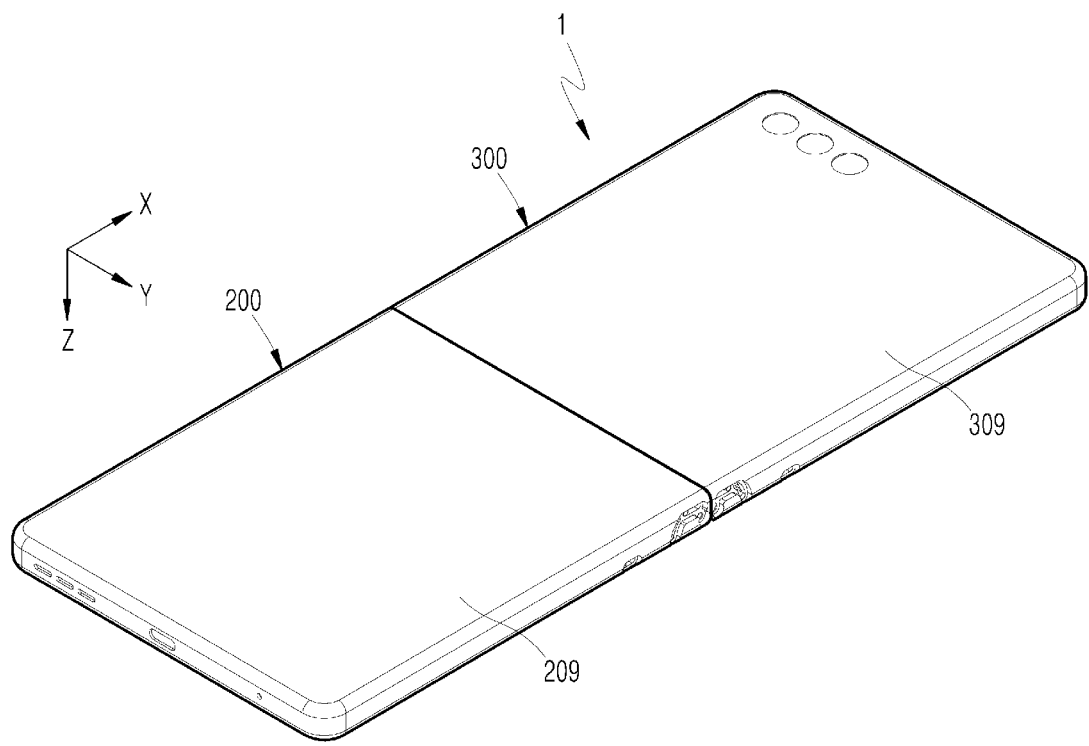
[FIG. 4A]
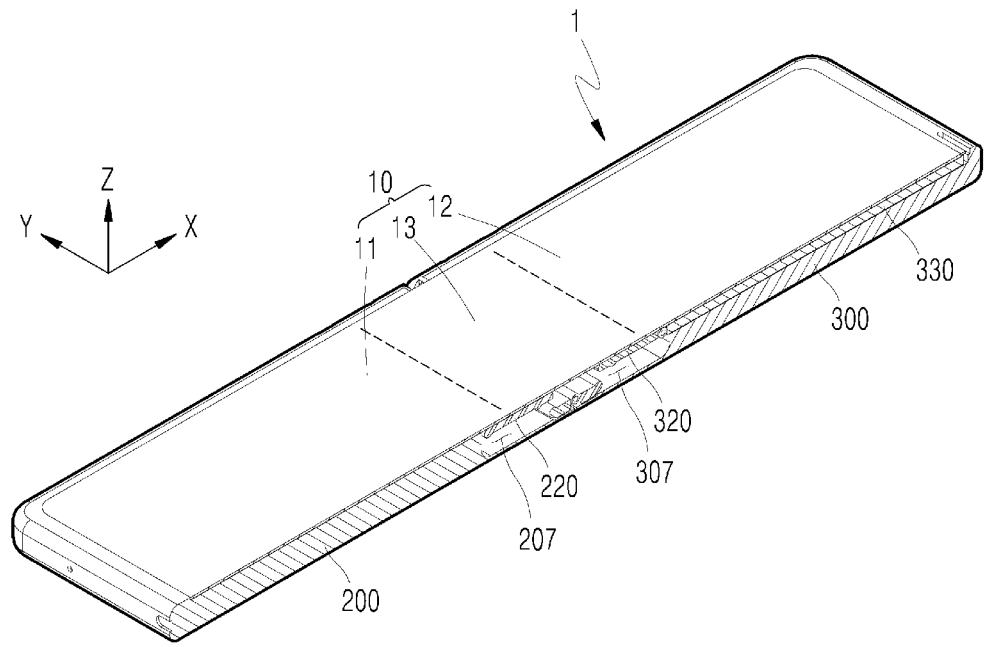

[FIG. 4B]
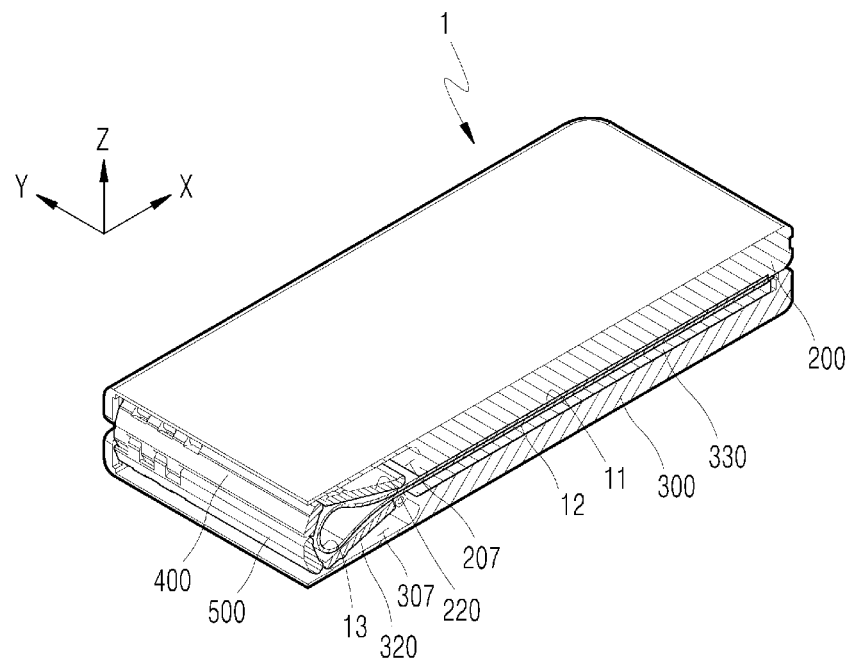

[FIG. 5]
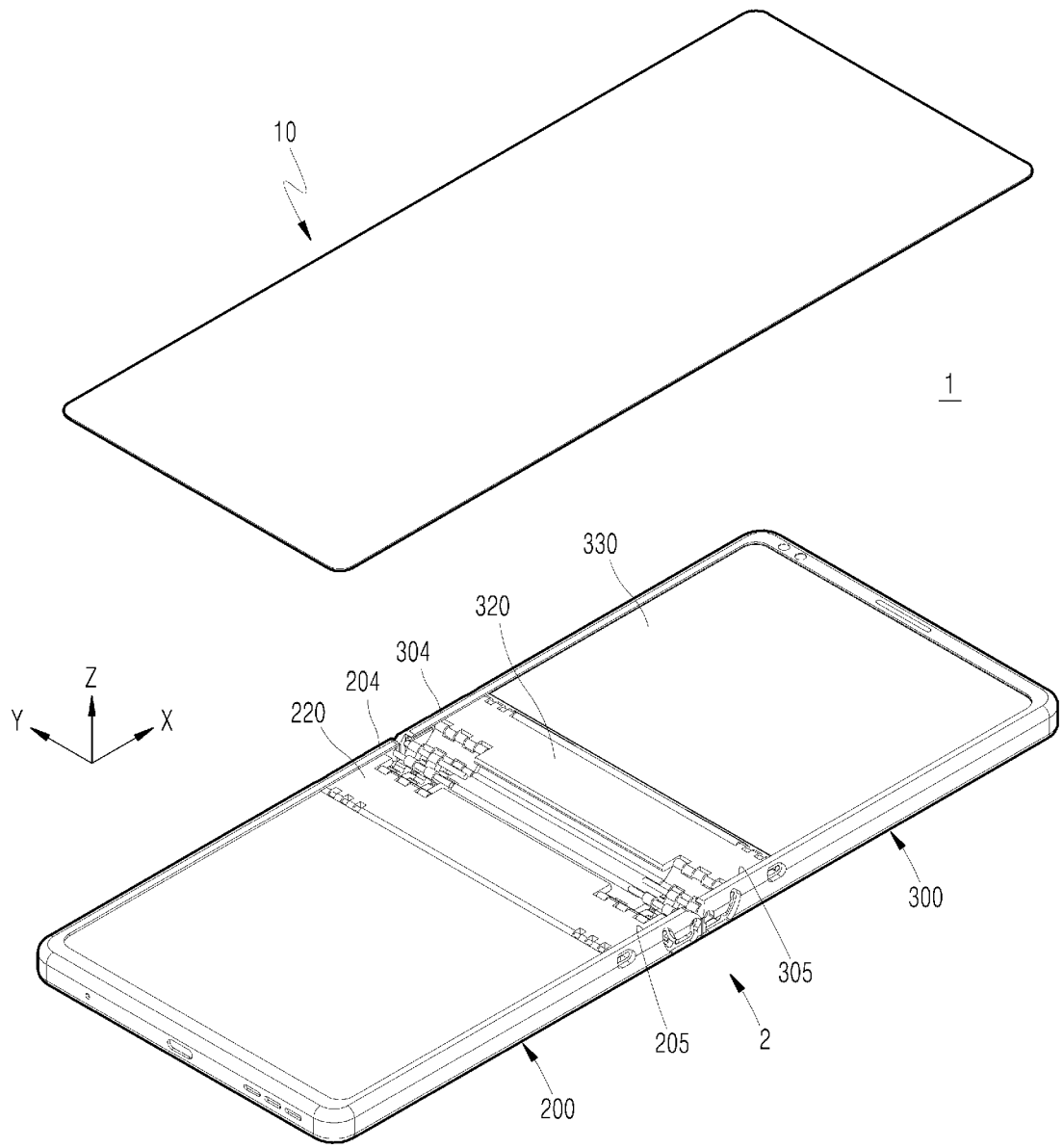

[FIG. 6]
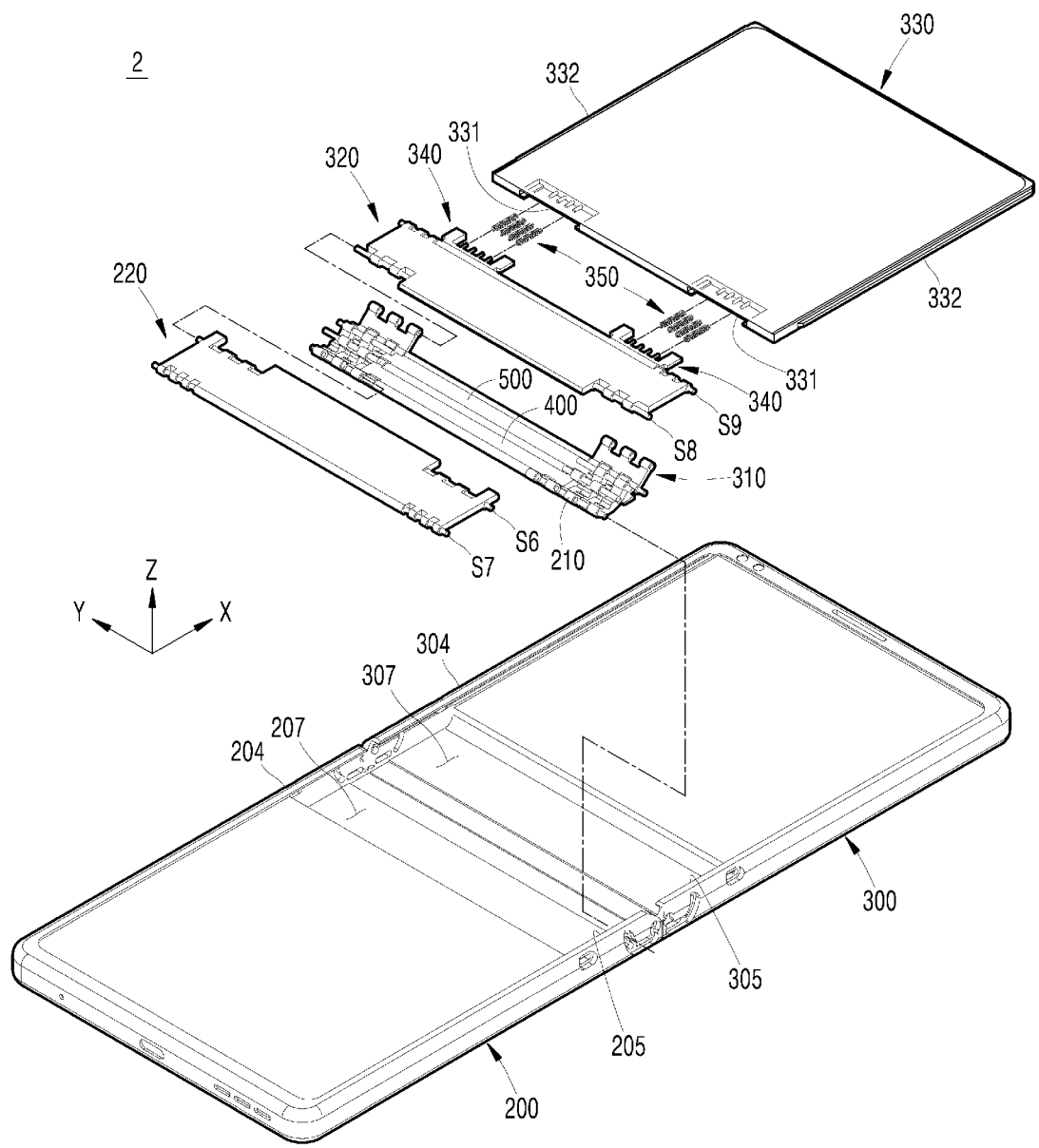

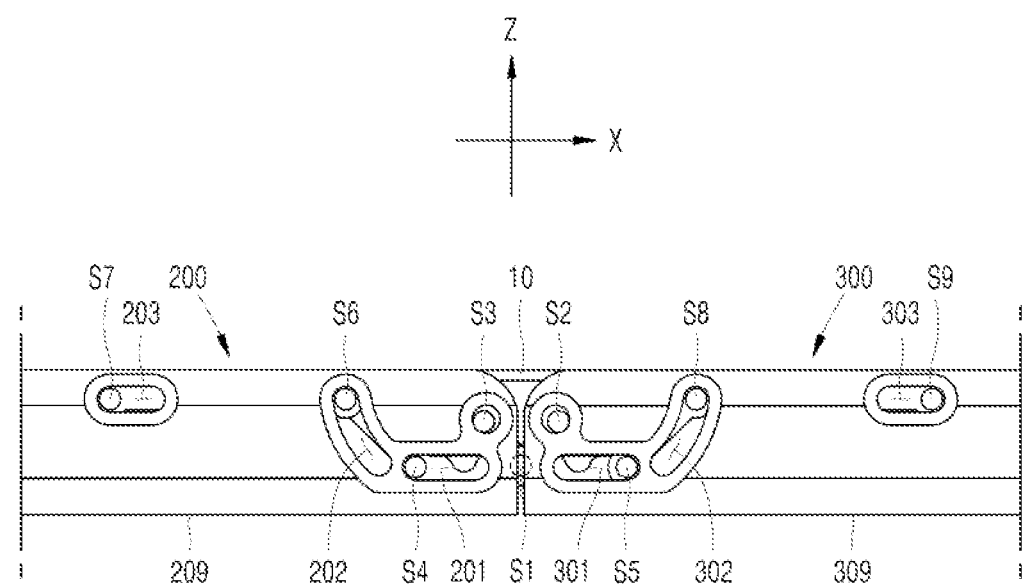
[FIG. 7A]

[FIG. 7B]
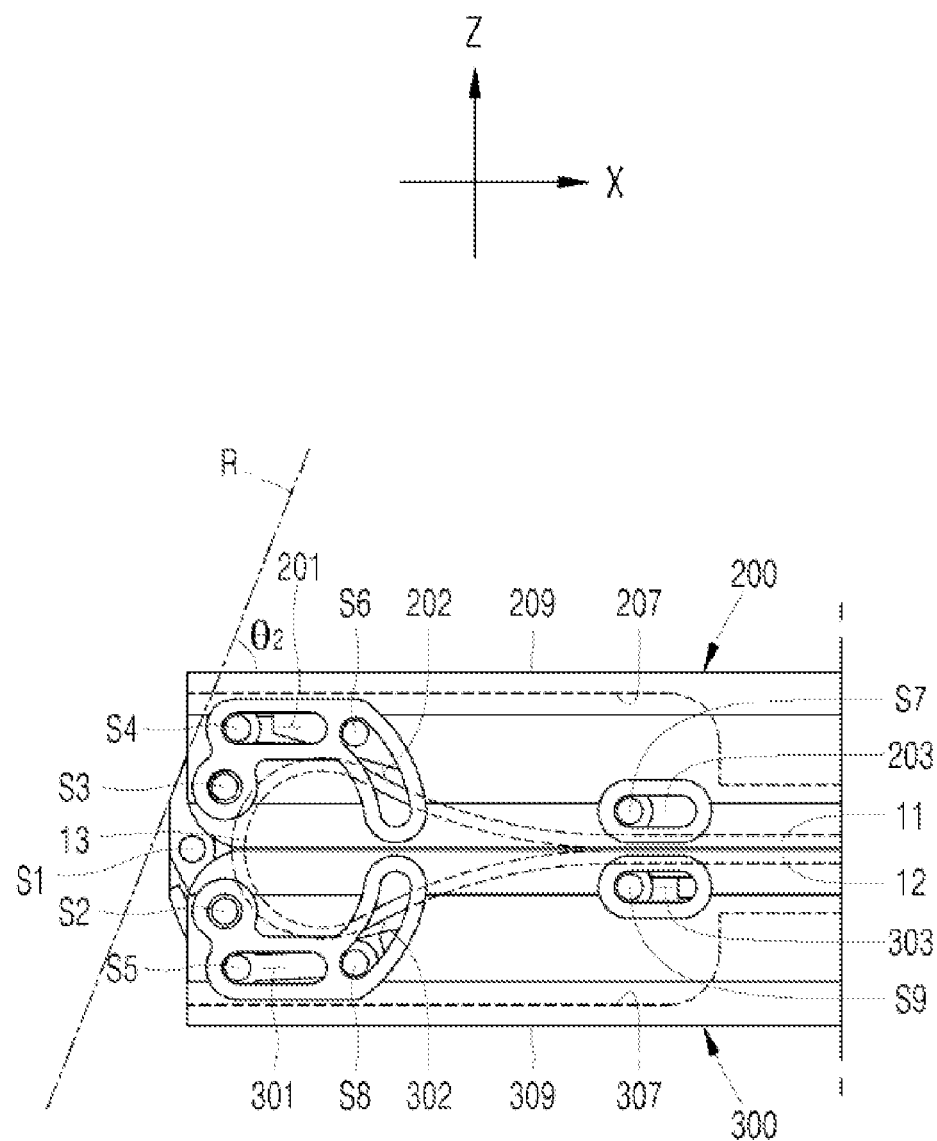

[FIG. 8A]
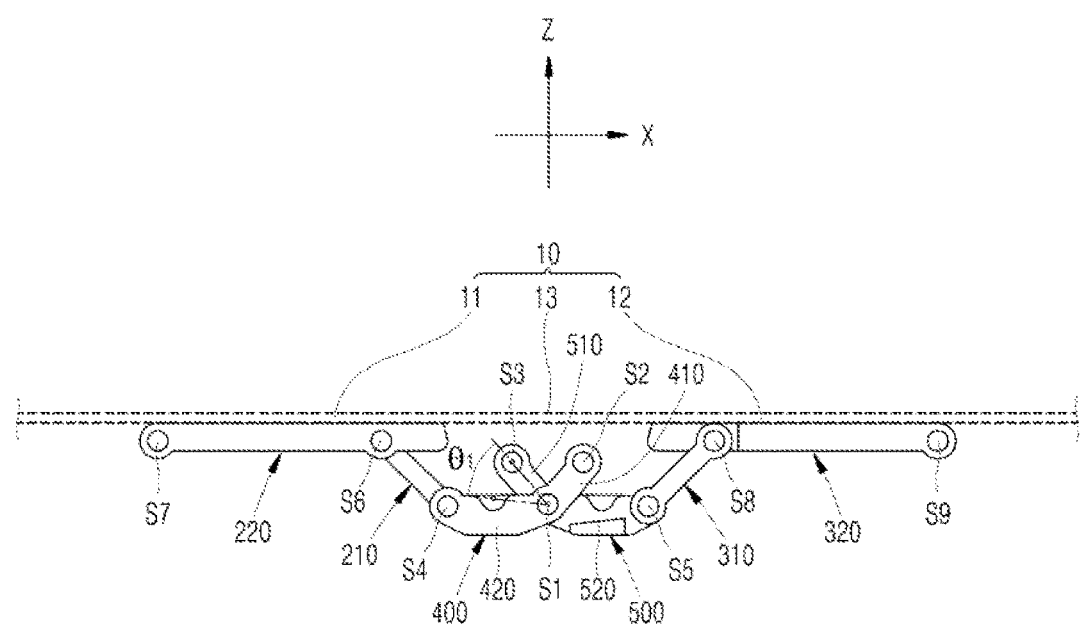

[FIG. 8B]
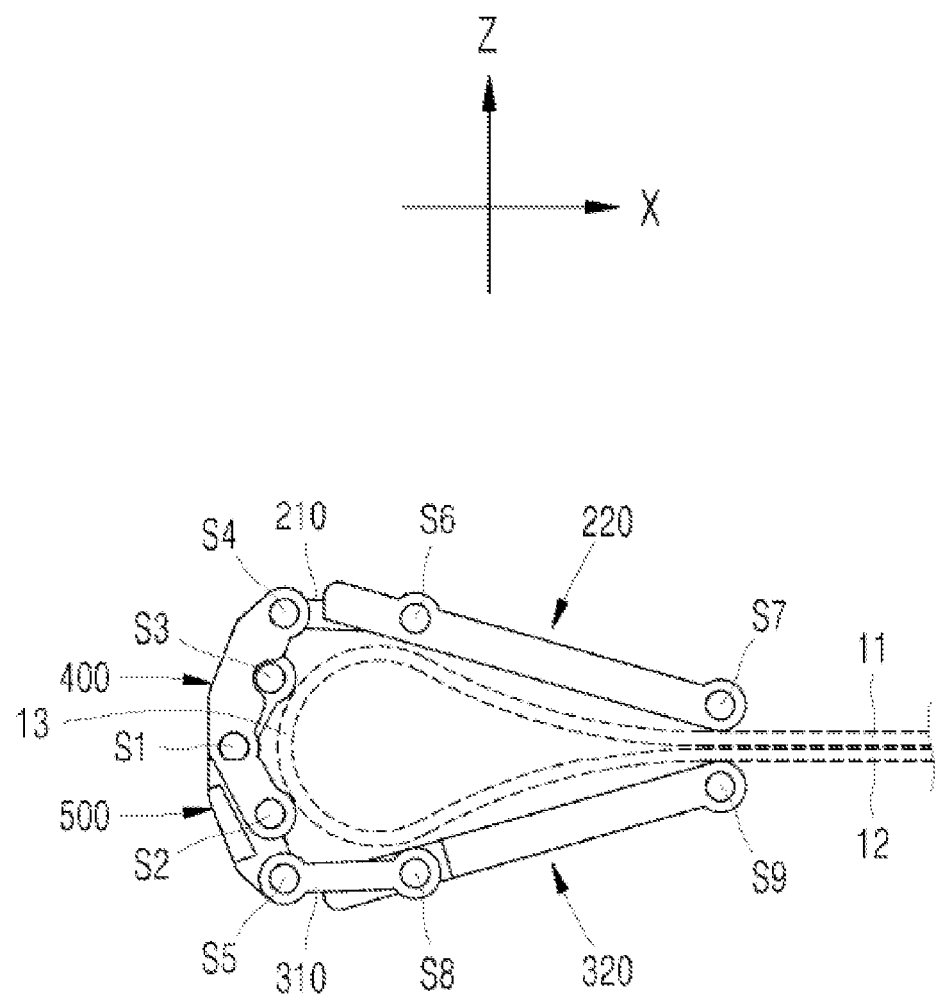

[FIG. 9]
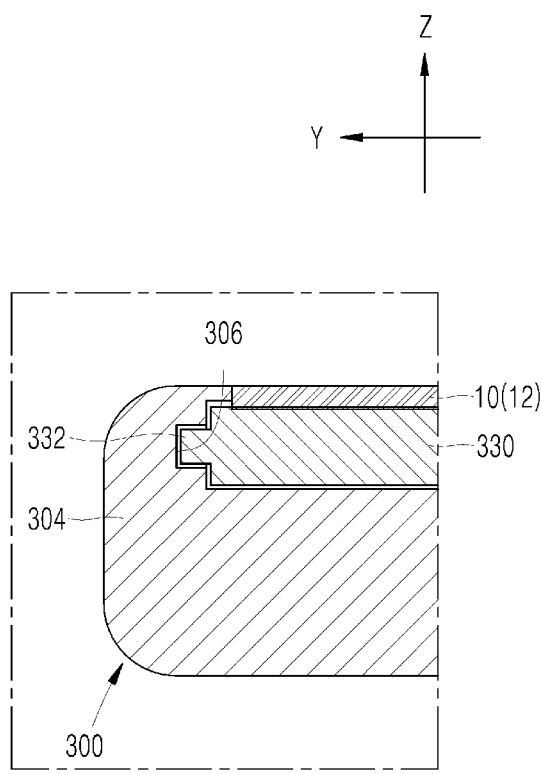

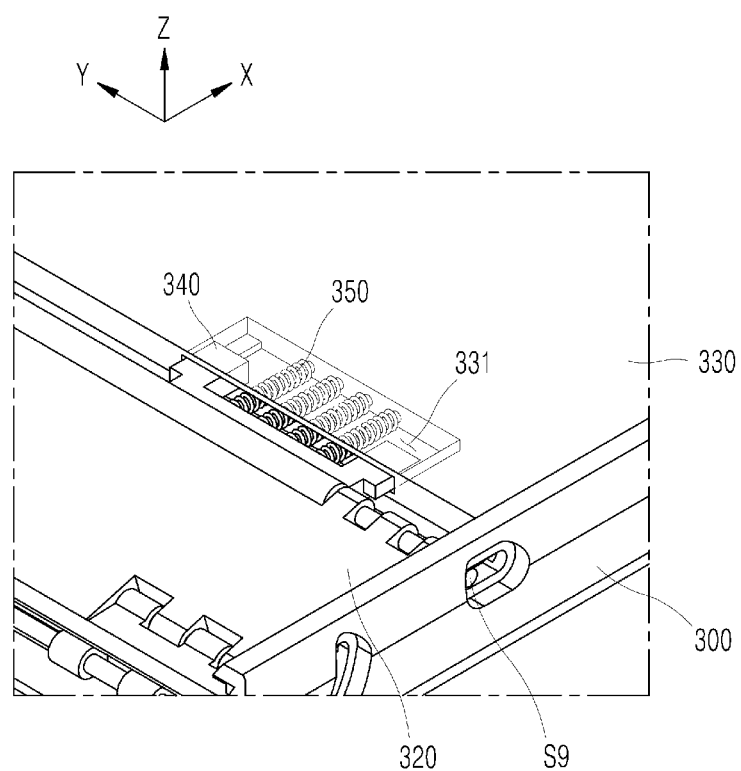
[FIG. 10]

[FIG. 11A]
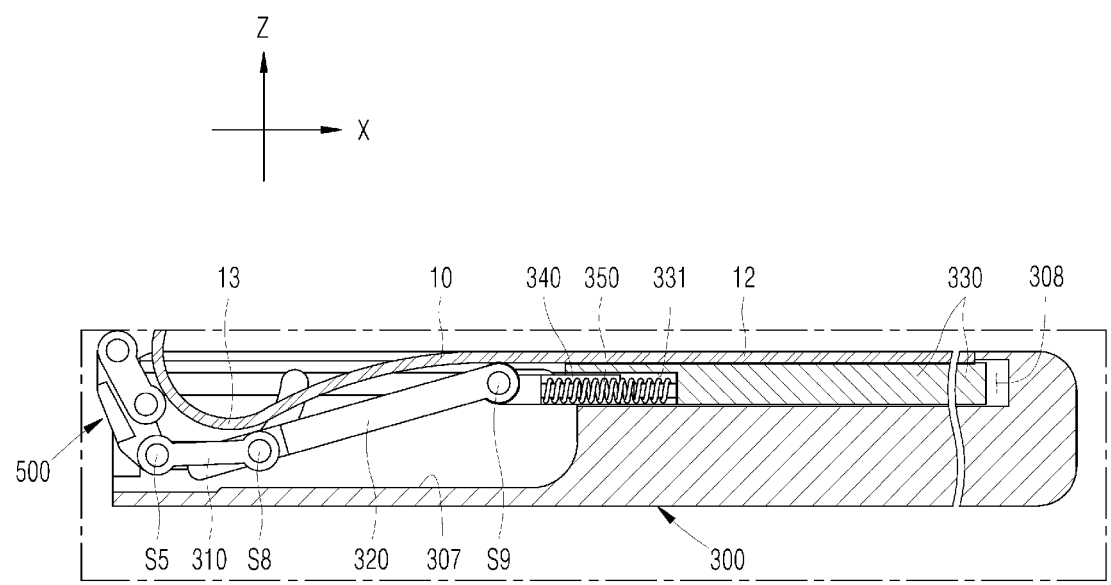

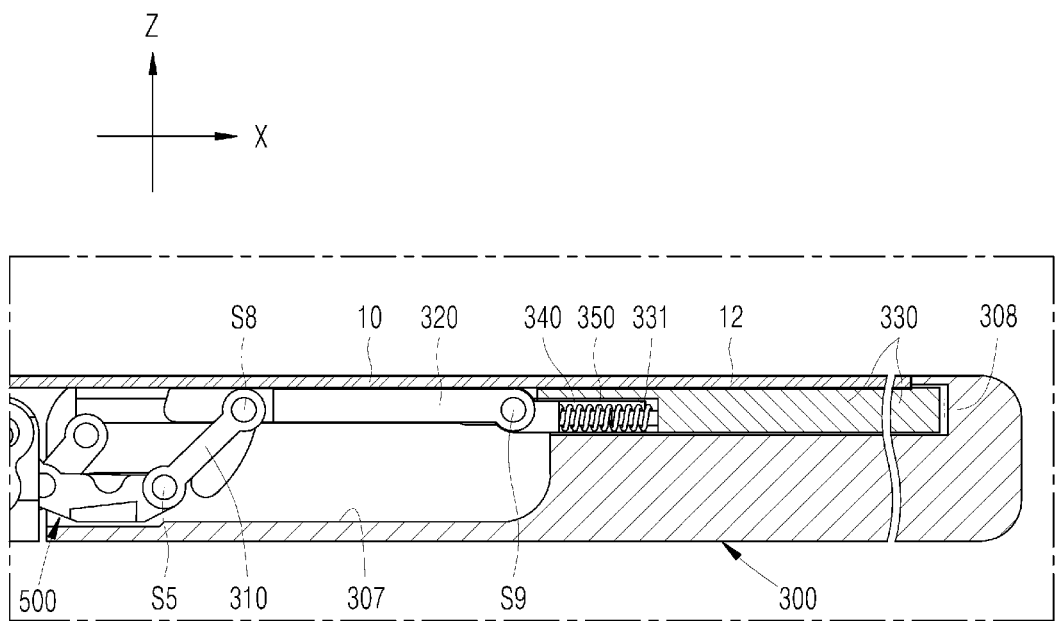
[FIG. 11B]

FLEXIBLE DISPLAY DEVICE

CROSS-REFERENCE TO RELATED APPLICATION

Pursuant to 35 U.S.C. § 119, this application claims the benefit of earlier filing date and right of priority to International Application No. PCT/KR2019/004374, filed on Apr. 11, 2019, the contents of which are all hereby incorporated by reference herein in their entirety.

BACKGROUND

1. Technical Field

The present disclosure relates to a device including a flexible display that may be bent, and more particularly, to a flexible display device in which the flexible display is folded inward and unfolded again.

2. Description of Related Art

As flexible displays which are bendable while displaying image information are developed, studies are being conducted and developments are being made regarding a foldable type device in which a flexible display is applied to a device having two bodies and folding structures (for example, hinge units). In such a device, since the flexible display may be entirely disposed on two bodies via the folding structure, a large sized display may be implemented in the device.

As examples of foldable type devices, as shown in FIG. 1, there is an in-folding type device (see FIG. 1A) and an out-folding type device (see FIG. 1B).

When a flexible display P is changed to the folding state while the flexible display P is coupled to the front of an unfolded first body B1 and a second body B2, in an in-folding device, the flexible display P is located on the inside, and the first body B1 and the second body B2 are located on the outside of the folded flexible display P.

Then, when the flexible display P is changed to the folding state while the flexible display P is coupled to the front of the unfolded first body B1 and the second body B2, in an out-folding device, the first body B1 and the second body B2 are folded into each other, and the flexible display P is located on the outside of the first body B1 and the second body B2.

In the in-folding type device, compared to the out-folding type device described above, since the flexible display P is located between the first body B1 and the second body B2 while the flexible display P is folded, in this state, the flexible display P may be protected from the outside.

In relation to a device of the in-folding type, Korean Patent Registration No. 1911047 (hereinafter referred to as 'related art document') discloses a 'case and display device', in which the case includes a first main body located corresponding to a first area of the display panel and a second main body located corresponding to a second area of the display panel.

In the related art document, the first main body is provided with a first floating space, and the second main body is provided with a second floating space, and when the first body and the second body are folded into each other, the curved portion of the display panel is positioned in the first floating space and the second floating space.

That is, in the related art document, when the first body and the second body are folded into each other, the middle portion of the display panel is bent at a predetermined curvature so as to be positioned in the first floating space and the second floating space.

However, in devices of the in-folding type, including that of the related art document, in order to implement folding and unfolding between two bodies, a hinge device connecting the first body and the second body may be generally provided.

In the device of the in-folding type, in a state where two bodies are unfolded (unfolding state), the first body and the second body need to have a sense of unity, as if they consist of one body, and in order to make the flexible display flat, in relation to the first body and the second body, the front side may form the same plane, and the rear side (opposite side of the flexible display) may form the same plane.

Here, when the hinge device protrudes from the first body and the second body, it may damage the sense of unity and overall aesthetic of the first body and the second body, and may also cause inconvenience in use.

Meanwhile, in in-folding type devices, a main task is to enable the implementation of a large-screen flexible display in a state where two bodies are unfolded. Therefore, in forming the hinge device in an in-folding type device, the hinge device needs to be made so as not to interfere with the display implementation of the large screen.

For example, when the hinge device is formed in a bezel portion of the in-folding type device or increases the width of the bezel portion, since there is a limit as to expansion of the screen of the flexible display compared to the size of the entire device, the hinge device needs to be made so that the width of the bezel portion does not extend.

Also, in an in-folding type device, as also shown in the related art document, the middle portion of the flexible display may be curved to a predetermined curvature in the folding state, and when switching from the folding state to the unfolding state, a support structure that may support the middle portion of the flexible display is required, and the support structure needs to be made to be variable so as to operate in conjunction with the operation of the hinge device.

Meanwhile, in an in-folding type device, a predetermined tension may be applied to the flexible display so that the flexible display may be flattened as a whole in an unfolding state.

However, even when switching from the unfolding state to the folding state, if a continuous tension is applied to the flexible display, since this action may damage the flexible display and the entire device, it is necessary to prevent it.

SUMMARY OF THE INVENTION

An aspect of the present disclosure is to provide an in-folding type flexible display device and a hinge assembly used therein in which a hinge portion connecting two bodies does not protrude toward the outside of the bodies when the flexible display device is in an unfolding state.

Another aspect of the present disclosure is to provide a flexible display device and a hinge assembly used therein in which the first body and the second body may be folded and unfolded smoothly without increasing the width of a bezel portion.

Another aspect of the present disclosure is to provide a flexible display device and a hinge assembly used therein in which the hinge portion is changed so as not to interfere with a folding portion of the flexible display when the flexible display device is switched from the unfolding state to a folding state, and in which the hinge portion may furthermore protect the flexible display.

Another aspect of the present disclosure is to provide a flexible display device and a hinge assembly used therein having a support structure that may support a middle portion of the flexible display when switching from the folding state to the unfolding state, and which may be varied so as to operate in conjunction with the operation of the hinge.

Another aspect of the present disclosure is to provide a flexible display device and a hinge assembly used therein that has a new mechanism that exerts a predetermined tension on the flexible display in an unfolding state and reduces the tension in the folding state.

In a flexible display device and a hinge assembly used therein according to an embodiment of the present disclosure, in an unfolding state in which a first body and a second body are unfolded from each other, in order for a first link a the second link not to protrude out of the first body and the second body, a central rotating shaft, which is a rotating shaft between the first link and the second link, is located in further frontward than rear surfaces of the first body and the second body.

The flexible display device according to this embodiment of the present disclosure includes a flexible display.

In an embodiment of the present disclosure, the flexible display device and the hinge assembly used therein include a first body, a second body, a first link, and a second link.

The first body and the second body are configured to be folded into each other in a frontward direction while the flexible display is located at a front side, and unfolded again.

The first link is rotatably coupled to the second body at a first fixed rotating shaft, and slidably and rotatably coupled to the first body at a first moving rotating shaft.

The second link rotatably coupled to the first link with respect to the central rotating shaft such that the second link intersects with the first link at the central rotating shaft.

The second link is rotatably coupled to the first body at a second fixed rotating shaft that is farther from a rear surface of the first body than the first moving rotating shaft, and is slidably and rotatably coupled to the second body at a second moving rotating shaft that is closer to a rear surface of the second body than the first fixed rotating shaft.

In a flexible display device and a hinge assembly used therein according to an embodiment of the present disclosure, in order to ensure smooth folding and unfolding without increasing the width of a bezel, in the unfolding state, the first link and the second link are configured to be provided inside a first receiving portion of the first body and a second receiving portion of the second body.

An end portion of each of the first fixed rotating shaft and the second moving rotating shaft may be coupled to at least a portion of both edges of the second body, and an end portion of each of the second fixed rotating shaft and the first moving rotating shaft may be coupled to at least a portion of both edges of the first body.

In a flexible display device and a hinge assembly used therein according to an embodiment of the present disclosure, when the flexible display device is switched from the unfolding state to the folding state, the first link and the second link are changed so as not to interfere with the folding portion of the flexible display, and in order for the first link and the second link to protect the folding portion of the flexible display, in the unfolding state, the first moving rotating shaft is closer to the rear surface of the first body than the central rotating shaft or the same distance from the rear surface of the first body as the central rotating shaft, and the second moving rotating shaft is closer to the rear surface of the second body than the central rotating shaft or the same distance from the rear surface of the second body as the central rotating shaft.

In addition, in a flexible display device and a hinge assembly used therein according to an embodiment of the present disclosure, the first link and the second link are symmetrical when viewed from the axial direction of the central rotating shaft, and in a state where the first body and the second body are unfolded from each other, a distance from the second fixed rotating shaft to the central rotating shaft is shorter than a distance from the second fixed rotating shaft to the first moving rotating shaft.

In addition, in a flexible display device and a hinge assembly used therein according to an embodiment of the present disclosure, the first link and the second link are symmetrical when viewed from the axial direction of the central rotating shaft, and when a maximum rotation angle of the second fixed rotating shaft based on the position of the central rotating shaft in the first link is called θ1 and a maximum rotation angle of the first body based on the first link is called θ2, the following equation is satisfied:

$$\theta1 + 2*\theta2 = 180°$$

A flexible display device and a hinge assembly used therein according to an embodiment of the present disclosure include a first support plate and a second support plate to support the folding portion of the flexible display when the folding state is changed to the unfolding state.

The flexible display device and the hinge assembly according to this embodiment of the present disclosure may include a third link, a fourth link, a first support plate, and a second support plate.

When the folding state and the unfolding state are switched, the first support plate and the second support plate operate in conjunction with the operation of the first link and the second link.

The third link is rotatably coupled to the first link at the first moving rotating shaft.

The fourth link is rotatably coupled to the second link at the second moving rotating shaft.

The first support plate is rotatably coupled to the third link at a third moving rotating shaft that is farther from the central rotating shaft than the first moving rotating shaft, and is slidably and rotatably coupled to the first body at a fourth moving rotating shaft that is farther from the central rotating shaft than the third moving rotating shaft.

The second support plate is rotatably coupled to the fourth link at a fifth moving rotating shaft that is farther from the central rotating shaft than the second moving rotating shaft, and is slidably and rotatably coupled to the second body at a sixth moving rotating shaft that is farther from the central rotating shaft than the fifth moving rotating shaft.

In a state where the first body and the second body are folded into each other, the third moving rotating shaft may be closer to the rear surface of the first body than the fourth moving rotating shaft, and the fifth moving rotating shaft may be closer to the rear surface of the second body than the sixth moving rotating shaft.

When the first body and the second body are unfolded from each other, the third moving rotating shaft may be made to become farther away from the rear surface of the first body, and the fifth moving rotating shaft may be made to become farther away from the rear surface of the second body.

In a flexible display device and a hinge assembly used therein according to an embodiment of the present disclosure, while applying a predetermined tension to the flexible display in the unfolding state, in order to reduce the tension in the folding state, the flexible display may include a sliding plate, a connection body, and an elastic body.

Specifically, the sliding plate may be configured to support the flexible display, and may be slidably coupled to the second body.

The connection body may be connected to the second moving rotating shaft, and may move closer to or farther away from the sliding plate.

Meanwhile, the connection body may be connected to the sixth moving rotating shaft, and may move closer to or farther away from the sliding plate.

The elastic body is configured to provide an elastic force in a direction in which the sliding plate becomes farther away from the connection body.

The sliding plate may have an insertion groove into which the connection body is slidably inserted.

The elastic body may be received in the insertion groove.

In the flexible display device and the hinge assembly used therein according to an embodiment of the present disclosure, concave slide grooves are formed along the length direction in both edges of the second body, and a slide projection inserted into the slide groove is formed at both edges of the sliding plate.

In the flexible display device and the hinge assembly used therein according to embodiments of the present disclosure, when the first body and the second body are unfolded from each other, the central rotating shaft, which is a rotating shaft between the first link and the second link, is positioned further frontward than the rear surfaces of the first body and the second body. Accordingly, the first link and the second link do not protrude out of the first body and the second body.

In the flexible display device and the hinge assembly used therein according to the embodiments of the present disclosure, the first link, the second link, the third link, the fourth link, the first support plate, and the second support plate are configured to be provided inside the first receiving portion of the first body and the second receiving portion of the second body. Accordingly, folding and unfolding of the first body and the second body can be performed smoothly without increasing the width of the bezel portion.

In the flexible display device and the hinge assembly used therein according to the embodiments of the present disclosure, in the unfolding state, the first moving rotating shaft is closer to the rear surface of the first body than the central rotating shaft or the same distance from the rear surface of the first body as the central rotating shaft, and the second moving rotating shaft is closer to the rear surface of the second body than the central rotating shaft or the same distance from the rear surface of the second body as the central rotating shaft. In addition, when viewed from the axial direction of the central rotating shaft, the first link and the second link are symmetrical. Further, in the unfolding state, the distance from the second fixed rotating shaft to the central rotating shaft is made shorter than the distance from the second fixed rotating shaft to the first moving rotating shaft. Accordingly, the first link and the second link can be changed so as not to interfere with the folding portion of the flexible display, and the first link and the second link can be changed to protect the flexible display.

The flexible display device and the hinge assembly used therein according to the embodiments of the present disclosure include the third link, the fourth link, the first support plate and the second support plate. Accordingly, when switching from the folding state to the unfolding state, the first support plate and the second support plate can support the folding portion of the flexible display and the operation of the first support plate, and the second support plate can be varied so as to operate in conjunction with the operation of the first link and the second link.

In the flexible display device and the hinge assembly used therein according to the embodiments of the present disclosure, in the unfolding state, the sliding plate may pull the flexible display, and the flexible display may be pulled tight. In addition, when switching from the unfolding state to the folding state, the connection body moves away from the sliding plate, and as the elastic body recovers elasticity, the elastic force stored in the elastic body decreases. Accordingly, an excessive load on the flexible display may be prevented.

More specific effects and additional effects exhibited by the flexible display device and the hinge assembly used therein will be described below with reference to the accompanying drawings.

BRIEF DESCRIPTION OF THE DRAWINGS

FIGS. 1A and 1B are diagrams illustrating an in-folding type device and an out-folding type device in a device including a flexible display.

FIG. 2 is a block diagram illustrating a flexible display device according to an embodiment of the present disclosure.

FIG. 3A is a perspective view illustrating a flexible display device according to another embodiment of the present disclosure.

FIG. 3B is a perspective view illustrating a state in which the flexible display device shown in FIG. 3A is folded.

FIG. 3C is a perspective view of the flexible display device shown in FIG. 3A when viewed from the rear.

FIG. 4A is a perspective view illustrating the flexible display device shown in FIG. 3A in a cross-sectional view as viewed from A-A'.

FIG. 4B is a perspective view illustrating the flexible display device shown in FIG. 3B in a cross-sectional view as viewed from B-B'.

FIG. 5 is a perspective view illustrating a state in which the flexible display is separated from the flexible display device shown in FIG. 3A.

FIG. 6 is a perspective view when components of a hinge assembly of the flexible display device shown in FIG. 5 are separated.

FIGS. 7A and 7B are side views illustrating a state in which the flexible display device is switched from an unfolding state to a folding state according to an embodiment of the present disclosure. In FIG. 7, a part of the interior of the first body and the second body and a part of the flexible display are indicated by dotted lines.

FIGS. 8A and 8B are side views illustrating a state in which a flexible display device is switched from an unfolding state to a folding state according to an embodiment of the present disclosure. However, in FIGS. 8A and 8B, in order to represent the interior of the first body and the second body, a state in which the first body and the second body are excluded is shown. In FIGS. 8A and 8B, the flexible display is indicated in a dotted line form.

FIG. 9 is a view showing a portion of the cross-section of the second body portion in the flexible display device according to an embodiment of the present disclosure.

FIG. 10 is a perspective view illustrating some components of a flexible display device according to an embodiment of the present disclosure. In FIG. 10, the sliding plate in a transparent form is shown, so that the inside of the insertion groove can be seen.

FIG. 11A is a longitudinal cross-sectional view of a second body part when the flexible display device is in a folding state according to an embodiment of the present disclosure.

FIG. 11B is a longitudinal cross-sectional view of a second body part when the flexible display device is in an unfolding state according to an embodiment of the present disclosure.

DETAILED DESCRIPTION

Reference will now be made in detail to embodiments of the present disclosure, examples of which are shown in the accompanying drawings. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. Further, the accompanying drawings are provided for more understanding of the embodiment disclosed in the present specification, but the technical spirit disclosed in the present disclosure is not limited by the accompanying drawings. It should be understood that all changes, equivalents, and alternatives included in the spirit and the technical scope of the present disclosure are included.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the singular forms are intended to include the plural forms as well, unless the context clearly indicates otherwise.

The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

A flexible display device (hereinafter, referred to as a 'display device') described in the present specification may include a mobile terminal such as a portable phone, a smart phone, a laptop computer, a digital broadcasting terminal, a personal digital assistant (PDA), a portable multimedia player (PMP), a navigation, a slate PC, a tablet PC, an ultrabook, a wearable device, a smartwatch, a smart glass, a head mounted display (HMD), and the like.

It will be apparent to those skilled in the art that the configuration according to the embodiment disclosed in the present specification may be applied to a fixed terminal such as a digital TV, a desktop computer, a digital signage except for an example that is applied only to a mobile terminal.

Hereinafter, in the present disclosure, for the convenience of description, the mobile terminal will be first described as an example of the display device.

FIG. 2 is a block diagram for explaining a mobile terminal 100 according to the present disclosure.

The mobile terminal 100 includes a wireless communicator 110, an input interface 120, a sensor 140, an output interface 150, an interface 160, a memory 170, a controller 180, and a power supplier 190. Components shown in FIG. 2 are not essential to implement the mobile terminal, and the mobile terminal described in the present disclosure may include more or fewer components than the components described above.

More specifically, the wireless communicator 110 may include one or more modules which enable the wireless communication between the mobile terminal 100 and a wireless communication system, between the mobile terminal 100 and another mobile terminal 100, or between the mobile terminal 100 and an external server. Further, the wireless communicator 110 may include one or more modules which connect the mobile terminal 100 to one or more networks.

The wireless communicator 110 may include at least one of a broadcasting receiving module 111, a mobile communication module 112, a wireless internet module 113, a near field communication module 114, or a position information module 115.

The input interface 120 may include a camera 121 or an image input interface which inputs an image signal, a microphone 122 or an audio input interface which inputs an audio signal, and a user input interface 123 (for example, a touch key or a mechanical key) which receives information from a user. Voice data or image data collected by the inputter 120 may be analyzed and processed as a control command of the user.

The sensor 140 may include one or more sensors which sense at least one of information in the mobile terminal, surrounding environment information around the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121 or a microphone 122), a battery gauge, an environment sensor (for example, a barometer, a hygrometer, a thermometer, a radiation sensor, a thermal sensor, a gas sensor, etc.), or a chemical sensor (for example, an electronic nose, a healthcare sensor, a biometric sensor, etc.). Further, the mobile terminal disclosed in the present specification may combine and utilize information sensed by at least two sensors from the above-mentioned sensors.

The output interface 150 generates outputs related to visual, auditory, or tactile senses, and may include at least one of a display 151, a sound output interface 152, a haptic module 153, or an optical output interface 154. The display 151 forms a mutual layered structure with a touch sensor or is formed integrally to be implemented as a touch screen. The touch screen simultaneously may serve as a user input interface 123 which provides an input interface between the mobile terminal 100 and the user and provides an output interface between the mobile terminal 100 and the user.

The interface 160 serves as a passage between various types of external devices which are connected to the mobile terminal 100. The interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The mobile terminal 100 may perform appropriate control related to the connected external device in accordance with the connection of the external device to the interface 160.

Further, the memory 170 may store data which supports various functions of the mobile terminal 100. The memory 170 may store a plurality of application programs (or applications) driven in the mobile terminal, data and commands for operations of the mobile terminal 100. At least some of the application programs may be downloaded via an external server through wireless communication. Further, at least some of the application programs may reside on the mobile terminal 100 from the time of departure for the basic functions (for example, call incoming, call outgoing, message receiving, or message sending function) of the mobile terminal 100. The application program is stored in the memory 170, and is installed on the mobile terminal 100 to be driven by the controller 180 to perform an operation (or functions) of the mobile terminal.

In addition to the operation related to the application program, the controller 180 may generally control an overall operation of the mobile terminal 100. The controller 180 may process a signal, data, or information which is inputted or outputted through the above- described components or drive the application programs stored in the memory 170 to provide or process appropriate information or functions to the user.

Further, in order to drive the application program stored in the memory 170, the controller 180 may control at least some of components described with reference to FIG. 2. Moreover, the controller 180 may combine and operate at least two of components included in the mobile terminal 100 to drive the application program.

The power supplier 190 receives application of external power or internal power, and supplies the power to the respective components included in the mobile terminal 100 under the control of the controller 180. The power supplier 190 includes a battery, and the battery may be an embedded battery or a replaceable battery.

At least some of the above-described components may operate in cooperation with each other to implement the operation, the control, or the control method of the mobile terminal according to various embodiments which will be described below. Further, the operation, the control, or the control method of the mobile terminal may be implemented on the mobile terminal by driving at least one application program stored in the memory 170.

Hereinafter, prior to describing various embodiments implemented by the mobile terminal 100 described above, the above-mentioned components will be described in more detail with reference to FIG. 2.

First, the wireless communicator 110 will be described. The broadcasting receiving module 111 of the wireless communicator 110 receives a broadcasting signal and/or broadcasting-related information from an external broadcasting management server through a broadcasting channel The broadcasting channel may include a satellite channel and a ground wave channel Two or more broadcasting receiving modules for simultaneous broadcasting reception or broadcasting channel switching for at least two broadcasting channels may be provided to the mobile terminal 100.

The broadcasting management sever may refer to a server which generates and transmits a broadcasting signal and/or broadcasting-related information or a server which is supplied with the previously generated broadcasting signal and/or broadcasting-related information to transmit the broadcasting signal and/or the broadcasting-related information to the terminal. The broadcasting signal includes not only a TV broadcasting signal, a radio broadcasting signal, and a data broadcasting signal, but also a broadcasting signal obtained by combining the TV broadcasting signal or the radio broadcasting signal with the data broadcasting signal.

The broadcasting signal may be encoded according to at least one of technical standards for transmitting and receiving a digital broadcasting signal (or broadcasting schemes, for example, ISO, IEC, DVB, or ATSC), and the broadcasting receiving module 111 may receive the digital broadcasting signal using an appropriate method for the technical specification determined by the technical standards.

The broadcasting-related information may refer to information related to a broadcasting channel, a broadcasting program, or a broadcasting service provider. The broadcasting-related information may also be provided through the mobile communication network. In this case, the broadcasting-related information may be received by the mobile communication module 112.

The broadcasting-related information may exist in various types such as an electronic program guide of digital multimedia broadcasting (DMB) or an electronic service guide of a digital video broadcast-handheld (DVB-H). The broadcasting signal and/or the broadcasting-related information received by the broadcasting receiving module 111 may be stored in the memory 170.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various types of data in accordance with transmission or reception of a text/multimedia message.

The wireless internet module 113 refers to a module for wireless internet connection and may be embodied in the mobile terminal 100 or installed at the outside of the mobile terminal 100. The wireless internet module 113 may be configured to transmit/receive a wireless signal in a communication network according to wireless internet technologies.

The wireless internet technique includes wireless LAN (WLAN), wireless fidelity (Wi-Fi), Wi-Fi direct, digital living network alliance (DLNA), wireless broadband (Wi-Bro), world interoperability for microwave access (Wi-MAX), high speed downlink packet access (HSDPA), high speed uplink packet access (HSUPA), long term evolution (LTE), and long term evolution-advanced (LTE-A). The wireless internet module 113 may transmit or receive data in accordance with at least one wireless internet technique within a range including internet techniques which have not been described above.

From the viewpoint that the wireless internet connection by WiBro, HSDPA, HSUPA, GSM, CDMA, WCDMA, LTE, LTE-A, etc. is performed by the mobile communication network, the wireless internet module 113 which performs the wireless internet connection through the mobile communication network may be understood as a type of the mobile communication module 112.

The near field communication module 114 is provided for short range communication and supports the near field communication using at least one of Bluetooth™, radio frequency identification (RFID), infrared data association (IrDA), ultra wideband (UWB), ZigBee, Near Field Communication (NFC), wireless fidelity (Wi-Fi), Wi-Fi Direct, or Wireless Universal Serial Bus (Wireless USB). The near field communication module 114 may support wireless communication between the mobile terminal 100 and the wireless communication system, between the mobile terminal 100 and the other mobile terminal 100, or between the mobile terminal 100 and a network in which the other mobile terminal 100 (or external server) is located, through the near field wireless communication network. The near field wireless communication network may be a near field wireless personal communication network.

Here, the other mobile terminal 100 may be a wearable device (for example, a smart watch, a smart glass, or a head mounted display (HMD)) which is capable of exchanging data (or interworking) with the mobile terminal 100 according to the present disclosure. The near field communication module 114 may detect (or recognize) a wearable device which is capable of communication with the mobile terminal 100, in the vicinity of the mobile terminal 100. Moreover, when the detected wearable device is authenticated to communicate with the mobile terminal 100 according to the present disclosure, the controller 180 may transmit at least a part of data processed in the mobile terminal 100 to the wearable device through the near field communication module 114. Therefore, the user of the wearable device may use the data processed in the mobile terminal 100 through the wearable device. For example, according to this, when a phone call is received by the mobile terminal 100, the user may make a phone call through the wearable device, or when a message is received by the mobile terminal 100, the user may check the received message through the wearable device.

The position information module 115 is a module for obtaining a position (or a current position) of the mobile terminal and a representative example thereof is a global positioning system (GPS) module or a wireless fidelity (Wi-Fi) module. For example, when the GPS module is utilized, the mobile terminal may obtain the position of the mobile terminal using a signal transmitted from the GPS satellite. As another example, when the Wi-Fi module is utilized, the mobile terminal may obtain the position of the mobile terminal based on information of a wireless access point (AP) which transmits and receives wireless signals with the Wi-Fi module. If necessary, the position information module 115 may perform any function of another module of the wireless communicator 110 to substitutably or additionally obtain data on the position of the mobile terminal. The position information module 115 is a module used to obtain a position (or a current position) of the mobile terminal, and is not limited to a module which directly calculates or obtains the position of the mobile terminal.

Next, the input interface 120 is provided to input video information (or signal), audio information (or signal), data, or information input from the user and in order to input the video information, the mobile terminal 100 may include one or a plurality of cameras 121. The camera 121 processes an image frame such as a still image or a moving image obtained by an image sensor in a video call mode or a photographing mode. The processed image frame may be displayed on the display 151 or stored in the memory 170. Further, the plurality of cameras 121 equipped in the mobile terminal 100 may be disposed to form a matrix structure and a plurality of image information having various angles or focal points may be inputted to the mobile terminal 100 through the cameras 121 that form the matrix structure. Further, the plurality of cameras 121 may be disposed to have a stereo structure to obtain a left image and a right image to implement a stereoscopic image.

The microphone 122 processes an external sound signal as electrical voice data. The processed voice data may be utilized in various forms in accordance with a function which is being performed by the mobile terminal 100 (or an application program which is being executed). In the microphone 122, various noise removal algorithms which remove a noise generated during the process of receiving the external sound signal may be implemented.

The user input interface 123 receives information from the user, and when the information is inputted through the user input interface 123, the controller 180 may control the operation of the mobile terminal 100 so as to correspond to the input information. The user input interface 123 may include a mechanical input interface (or a mechanical key, for example, a button located on a front, rear, or side surface of the mobile terminal 100, a dome switch, a jog wheel, a jog switch, etc.) and a touch type input interface. For example, the touch type input interface may be formed by a virtual key, a soft key, or a visual key which is disposed on the touch screen through a software process or a touch key which is disposed on a portion other than the touch screen. The virtual key or the visual key may be displayed on the touch screen in various shapes, and for example, may be formed by graphics, text, icons, video, or a combination thereof.

The sensor 140 senses at least one of information in the mobile terminal, surrounding environment information around the mobile terminal, or user information and generates a sensing signal corresponding to the information. The controller 180 may control the driving or the operation of the mobile terminal 100 or perform data processing, functions, or operations related to the application program installed in the mobile terminal 100, based on the sensing signal. Representative sensors among various sensors which may be included in the sensor 140 will be described in more detail below.

First, the proximity sensor 141 is a sensor which senses the presence of an object approaching a predetermined sensing surface or nearby objects, using an electromagnetic field force or infrared ray without any mechanical contact. The proximity sensor 141 may be disposed in an internal area of the mobile terminal which is enclosed by the above-described touch screen or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect the proximity of the object with a change in the electric field in accordance with the proximity of the object having conductivity. In this case, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch". When the object actually touches the touch screen, it is referred to as a "contact touch". A position at which the object proximately touches the touch screen refers to a position at which the object vertically corresponds to the touch screen when the object proximately touches the touch screen. The proximity sensor 141 may sense a proximate touch and a proximate touch pattern (for example, a proximate touch distance, a proximate touch direction, a proximate touch speed, a proximate touch time, a proximate touch position, a proximate touch movement state, etc.). As described above, the controller 180 may process data (or information) corresponding to the proximate touch operation and the proximate touch pattern sensed by the proximity sensor 141, and may further output visual information corresponding to the processed data on the touch screen. Furthermore, the controller 180 may control the mobile terminal 100 to process different operations or data (or information) depending on whether the touch on the same point on the touch screen is a proximity touch or a contact touch.

The touch sensor senses a touch (or a touch input) applied to the touch screen (or the display 151) using at least one of various touch types such as a resistive film type, a capacitive type, an infrared type, an ultrasonic type, and a magnetic field type.

For example, the touch sensor may be configured to convert a change of a pressure which is applied to a specific portion of the touch screen, or a capacitance which is generated in a specific portion, into an electrical input signal. The touch sensor may be configured to detect a position and an area where a touch subject which applies a touch onto the touch screen is touched on the touch sensor, and a capacitance at the time of the touch. Here, the touch subject is an object which applies a touch to the touch sensor, and may include, for example, a finger, a touch pen, a stylus pen, a pointer, etc.

As described above, when there is a touch input to the touch sensor, corresponding signals are transmitted to a touch controller. The touch controller processes the signal(s) and then transmits corresponding data to the controller 180. By doing this, the controller 180 may confirm which area of the display 151 is touched. Here, the touch controller may be a separate component from the controller 180, or may be the controller 180 itself.

The controller 180 may perform different control or the same control depending on a type of a touch subject which touches the touch screen (or a touch key equipped other than the touch screen). Whether to perform the different control or the same control depending on the type of touch subject may be determined in accordance with an operating state of the current mobile terminal 100 or an application program which is being executed.

A touch sensor and a proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object using an ultrasonic wave. The controller 180 may calculate a position of a wave generating source by information sensed by the optical sensor and the plurality of ultrasonic sensors. A position of the wave generating source may be calculated using the property that light is much faster than an ultrasonic wave, that is, the time in which light reaches the optical sensor is much faster than the time in which the ultrasonic wave reaches the ultrasonic sensor. More specifically, the position of the wave generating source may be calculated using a time difference of the time of arrival of the ultrasonic wave with respect to light which serves as a reference signal.

As seen from the configuration of the input interface 120, the camera 121 includes at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor, which is laminated on a display element, is configured to scan a motion of a sensing object proximate to the touch screen. More specifically, the photo sensor is formed by mounting photo diodes and transistors (TR) in rows/columns to scan contents which are disposed on the photo sensor using an electrical signal that changes in accordance with an amount of light applied to the photo diode. That is, the photo sensor calculates coordinates of a sensing object in accordance with a changed amount of light, and position information of the sensing object may be obtained through the coordinates.

The display 151 displays (outputs) information processed in the mobile terminal 100. For example, the display 151 may display execution screen information of an application program driven in the mobile terminal 100 and user interface (UI) and graphic user interface (GUI) information in accordance with the execution screen information.

Further, the display 151 may be configured as a stereoscopic display which displays a stereoscopic image.

A three-dimensional display type such as a stereoscopic type (a glass type), an autostereoscopic type (a glass-free type), a projection type (a holographic type) may be applied to the stereoscopic display.

The sound output interface 152 may output audio data received from the wireless communicator 110 or stored in the memory 170 in a call signal reception mode, a phone-call mode, a recording mode, a voice recognition mode, or a broadcasting reception mode. The sound output interface 152 may also output a sound signal related to a function (for example, a call signal reception sound or a message reception sound) performed in the mobile terminal 100. Such a sound output interface 152 may include, for example, a receiver, a speaker, and a buzzer.

The haptic module 153 may generate various tactile effects that the user may feel. A representative example of the tactile effect generated by the haptic module 153 may be vibration. An intensity and a pattern of the vibration generated in the haptic module 153 may be controlled by the selection of the user or a setting of the controller 180. For example, the haptic module 153 may compose different vibrations to output the composed vibrations, or sequentially output the different vibrations.

In addition to vibration, the haptic module 153 generates various tactile effects such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect by means of direct contact, but may also be implemented to allow the user to feel a tactile effect by muscular sensation of a finger or an arm. Two or more haptic modules 153 may be provided in accordance with a configuration aspect of the mobile terminal 100.

The optical output interface 154 outputs a signal for notifying occurrence of an event using light of a light source of the mobile terminal 100. Examples of events generated in the mobile terminal 100 may be message reception, call signal reception, missed call, alarm, schedule notification, email reception, and information reception through an application.

The signal outputted from the optical output interface 154 is implemented as the mobile terminal emits single color or a plurality of color light to a front surface or a rear surface. When the mobile terminal senses the event confirmation of the user, the signal output may be completed.

The interface 160 serves as a passage with all external devices which are connected to the mobile terminal 100. The interface 160 receives data from the external device or is supplied with the power source to transmit the power source to each component in the mobile terminal 100, or transmits data in the mobile terminal 100 to the external device. For example, the interface 160 may include a wired/wireless headset port, an external charger port, a wired/wireless data port, a memory card port, a port which connects a device equipped with an identification module, an audio input/output (I/O) port, a video input/output (I/O) port, an earphone port, etc.

The identification module is a chip in which various information for authenticating a usage right of the mobile terminal 100 is stored, and may include a user identity module (UIM), a subscriber identify module (SIM) a universal subscriber identify module (USIM), etc. A device with an identification module (hereinafter, "identification device") may be manufactured as a smart card. Therefore, the identification device may be connected to the equipment 100 through the interface 160.

When the mobile terminal 100 is connected to an external cradle, the interface 160 may serve as a passage through which the power is supplied from the cradle to the mobile terminal 100 or a passage through which various command signals are transmitted to the mobile terminal 100. Various command signals or the power inputted from the cradle may operate a signal for recognizing that the mobile terminal 100 is precisely mounted in the cradle.

The memory 170 may store a program for an operation of the controller 180, or temporarily store input/output data (for example, a phone book, a message, a still image, a moving image, etc.). The memory 170 may store data on a vibration or a sound of various patterns output when the touch is inputted onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to the application program and an overall operation of the mobile terminal 100. For example, when the state of the mobile terminal satisfies a predetermined condition, the controller 180 may execute or release a locking state which restricts an input of a control command of a user for the applications.

Further, the controller 180 may perform control and processing related to voice call, data communication, and video call, or perform a pattern recognition process which recognizes a handwriting input or a picture drawing input performed on the touch screen as a text or an image, respectively. Moreover, the controller 180 may control any one or a combination of a plurality of components described above to implement various embodiments which will be described below on the mobile terminal 100 according to the present disclosure.

The power supplier 190 receives application of an external power or an internal power by the control of the controller 180, and supplies the power required for operations of components. The power supplier 190 includes a battery, and the battery may be a chargeable embedded battery and be detachably coupled to the terminal body to be charged.

Further, the power supplier 190 includes a connection port, and the connection port may be configured as one example of an interface 160 to which an external charger which supplies a power to charge a battery is electrically connected.

As another example, the power supplier 190 may be configured to wirelessly charge the battery without using the connection port. In this case, the power supplier 190 may receive the power using one or more of an inductive coupling method based on a self-induction phenomenon or a magnetic resonance coupling method based on an electromagnetic resonance phenomenon.

Various embodiments below may be implemented in a recording medium readable by a computer or a similar device using hardware, software, or a combination thereof.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, two or more displays 151 may be provided in accordance with an implementation type of the mobile terminal 100. In this case, a plurality of displays may be disposed to be spaced apart from each other or integrally disposed on one surface of the mobile terminal 100 or may be disposed on different surfaces.

The display 151 may include a touch sensor which senses a touch on the display 151 so as to receive the control command by the touch method. Therefore, when the touch is made on the display 151, the touch sensor senses the touch, and based on the touch the controller 180 generates a control command corresponding to the touch. Contents inputted by the touch method may be letters or numbers, instructions in various modes, menu items which may be designated, or the like.

The microphone 122 is configured to receive a voice of the user, or other sounds. The microphone 122 is equipped in a plurality of locations to receive stereo sounds.

The interface 160 serves as a passage through which the mobile terminal 100 is connected to the external device. For example, the interface 160 may be at least one of a connection terminal for connection with other devices (for example, an earphone or an external speaker), a port for near field communication (for example, an infrared port (IrDA port), a Bluetooth port, a wireless LAN port, etc.), or a power supplier terminal for supplying a power to the mobile terminal 100. The interface 160 may be implemented as a socket type which accommodates an external card such as a subscriber identification module (SIM), a user identity module (UIM), and a memory card for information storage.

At least one antenna for wireless communication may be provided in a terminal body. The antenna may be embedded in the terminal body or formed in a case. For example, the antenna which forms a part of the broadcasting receiving module 111 (see FIG. 2) may be configured to be drawn from the terminal body. Alternatively, the antenna may be formed to be a film type to be attached onto an inner surface of a housing, or a case including a conductive material may serve as an antenna.

The terminal body includes the power supplier 190 (see FIG. 2) which supplies the power to the mobile terminal 100. The power supplier 190 may be embedded in the terminal body or include a battery 191 which is configured to be detachable at the outside of the terminal body.

The battery 191 may be configured to be supplied with power through a power cable connected to the interface 160. Further, the battery 191 may be configured to be wirelessly chargeable by a wireless charging device. The wireless charging may be implemented by a self-induction method or a resonance method (magnetic resonance method).

An accessory which protects an outer appearance or supports or extends the function of the mobile terminal 100 may be added to the mobile terminal 100. An example of the accessory may include a cover or a pouch which covers at least one surface of the mobile terminal 100 or accommodates the mobile terminal 100. The cover or the pouch may interwork with the display 151 to extend the function of the mobile terminal 100. Another example of the accessory may include a touch pen which supports or extends a touch input on the touch screen.

Hereinafter, in the description of the embodiments of the present disclosure, an X-direction, a Y-direction, and a Z-direction shown in the drawings are orthogonal to each other.

FIG. 3A is a perspective view illustrating a flexible display device 1 according to another embodiment of the present disclosure, FIG. 3B is a perspective view illustrating a folding state of the flexible display device 1 shown in FIG. 3A, and FIG. 3C is a perspective view when the flexible display device 1 shown in FIG. 3A is viewed from the rear.

FIG. 4A is a perspective view showing the flexible display device 1 shown in FIG. 3A in a cross-sectional view as seen from A-A', and FIG. 4B is a perspective view of the flexible display device 1 shown in FIG. 3B in a cross-sectional view as seen from B-B'.

The flexible display device 1 according to this embodiment of the present disclosure includes the flexible display 10.

In a state where the flexible display 10 is unfolded (for example, in a state where the flexible display 10 has an infinite curvature radius, hereinafter referred to as a 'first state'), the display area of the flexible display 10 may be flat. When the flexible display 10 is in a changed state due to application of an external force while in the first state (for example, a state in which at least a part of the flexible display 10 has a finite radius of curvature, hereinafter referred to as a 'second state'), the display area may be curved.

A part of the flexible display 10 may not be flat but may be bent. In this case, when an external force is applied to the flexible display 10, a part of the flexible display 10 may be changed into a flat state, or a less bent state or a more bent state.

The flexible display 10 is combined with a touch sensor to implement a flexible touch screen. When a touch is made on the flexible touch screen, the controller 180 (see FIG. 2) performs control corresponding to the touch input.

The display device 1 according to the modified example may include a state change sensor which senses a change of state of the flexible display 10. The state change sensor may be included in the sensor 140 (see FIG. 2).

The state change sensor may be provided in the flexible display 10, or in the first body 200 or the second body 300 described below, and may detect information related to a change of state of the flexible display 10. Here, the information related to the change of state may include a direction of the change of state of the flexible display 10, how much the state of the flexible display 10 is changed, the changed position, the time of the change, and an acceleration by which the changed flexible display 10 is restored. Further, various information which may be sensed by the bending of the flexible display 10 may also be included.

Further, the controller 180 (see FIG. 1) may change information disposed on the flexible display 10 or generate a control signal for controlling a function of the display device 1, based on the information related to the change of state of the flexible display 10 sensed by the state change sensor.

The change of the state of the flexible display 10 is not limited to change due to an external force. For example, when the flexible display 10 is in the first state, the flexible display 10 may be changed to the second state by a command of a user or an application.

The flexible display device 1 according to an embodiment of the present disclosure may include a first body 200 and a second body 300 rotatably connected to each other. In relation to a flexible display 10, a part 11 is coupled to the first body 200 side and another part 12 is coupled to the second body 300 side, and the flexible display 10 is formed in this state such that the state thereof is changeable.

A plurality of electronic components for driving the flexible display device 1 may be mounted in at least one area of the first body 200 and the second body 300.

In an embodiment of the present disclosure, the flexible display 10 may be divided into a first display portion 11, a second display portion 12, and a folding portion 13. At this time, the first display portion 11 may be a portion coupled to the first body 200 side, the second display portion 12 may be a portion coupled to the second body 300 side, and the folding portion 13 may be a portion between the first display portion 11 and the second display portion 12.

In this embodiment of the present disclosure, when the flexible display 10 is changed between the first state and the second state, the change may mainly be made in the folding portion 13.

In addition, in this embodiment of the present disclosure, when the flexible display 10 is changed between the first state and the second state, the change may be made only in the folding portion 13.

In addition, in this embodiment of the present disclosure, when the flexible display 10 is changed from the first state to the second state, as the folding portion 13 is bent, the first display portion 11 and the second display portion 12 may be placed parallel to each other and face each other.

The flexible display device 1 according to an embodiment of the present disclosure may be made to be folded and unfolded. In the unfolding state, the flexible display 10 may be in a first state, and in the folding state, the flexible display 10 may be in a second state.

In the second state where the flexible display 10 is folded, in order for the flexible display 10 not to be exposed to the outside, the first body 200 and the second body 300 may be folded and stacked on the outside of the flexible display 10.

FIGS. 3A and 4A illustrate unfolding (first state) in which the flexible display 10 is in an unfolding state, and FIGS. 3B and 4B illustrate folding (second state) in which the flexible display 10 is in an inward folding state.

In the following, as shown in FIGS. 3A and 4A, the "unfolding state" refers to a state where the first display portion 11 and the second display portion 12 are unfolded to form the same plane and a state where the first body 200 and the second body 300 are unfolded to form the same plane. As shown in FIGS. 3B and 4B, the "folding state" refers to a state where the first display portion 11 and the second display portion 12 are folded to be parallel to each other and a state where the first body 200 and the second body 300 are parallel to each other.

By the folding, the flexible display 10 is disposed inside the first body 200 and the second body 300. In this way, the flexible display device 1 of the present example may be an in-foldable type device.

According to the in-foldable structure, the flexible display 10 may not be exposed to the outside when folded, and the first body 200 and the second body 300 may shield the flexible display 10.

When the flexible display device 1 according to the embodiment of the present disclosure is folded, the first body 200 and the second body 300 may be overlapping and in close contact with each other, and the folding portion 13 between the first display portion 11 and the second display portion 12 of the flexible display 10 may be bent while forming a curved surface.

The folding portion 13 of the flexible display 10 may be positioned inside the first body 200 and the second body 300 when the flexible display device 1 is folded. The folding portion 13 may be positioned on a first receiving portion 207 provided inside the first body 200 and a second receiving portion 307 provided inside the second body 300 when the flexible display device is folded.

FIG. 5 is a perspective view when the flexible display 10 is separated from the flexible display device 1 shown in FIG. 3A. FIG. 6 is a perspective view when components of a hinge assembly of the flexible display device 1 shown in FIG. 5 are separated.

FIGS. 7A, 7B, 8A and 8B are views illustrating a side view of the flexible display device 1 according to an embodiment of the present disclosure, and are views for explaining the transition from an unfolding state to a folding state. In FIG. 7B, 'R' is a reference line for indicating a maximum rotation angle of the first body 200 with respect to a first link 400.

In relation to the flexible display device 1 according to an embodiment of the present disclosure, the first body 200 and the second body 300 are folded into each other so that the flexible display 10 changes from the first state to the second state. In addition, the first body 200 and the second body 300 which are folded to be changed from the second state to the first state are made to unfold again, and for this, a hinge assembly (hereinafter, a "hinge assembly 2") of the flexible display 10 is provided.

The hinge assembly 2 according to the embodiment of the present disclosure includes the first body 200 and the second body 300 described above, and also includes a first link 400 and a second link 500.

In the description of the embodiment of the present disclosure, as the first state in which the flexible display 10 is unfolded and accordingly in a state where the first body 200 and the second body 300 are unfolded from each other, with respect to the first body 200 and the second body 300, the side where the flexible display 10 is located will be defined as the front side (first side), and the reverse side thereof will be defined as the rear side (second side). In describing the flexible display device 1 and the hinge assembly 2 according to the embodiments of the present disclosure, front and rear directions may be parallel to the Z direction.

In a state where the first body 200 and the second body 300 are unfolded from each other, the direction from the first body 200 toward the second body 300 (or the direction from the second body 300 toward the first body 200) will be defined as a length direction. In describing the flexible display device 1 and the hinge assembly 2 according to embodiments of the present disclosure, the length direction may be a direction parallel to the X direction.

Further, when the flexible display device 1 is viewed from the front side, the direction crossing the length direction is defined as a width direction. In describing the flexible display device 1 and the hinge assembly 2 according to embodiments of the present disclosure, the width direction may be a direction parallel to the Y direction.

Rotating shafts described in this embodiment of the present disclosure are parallel to the axis of rotation when the first body 200 and the second body 300 rotate relative to each other.

When the hinge assembly 2 is viewed from the front side, the first link 400 and the second link 500 may be formed in a symmetrical form.

In the unfolding state, an inner end portion of the first body 200 and an inner end portion of the second body 300 may face each other. The inner end portion of the first body 200 and the inner end portion of the second body 300 may be close to each other, or may be in close contact with each other.

In the unfolding state, the front surface (first side) of the first body 200 and the front surface (first side) of the second body 300 may be made parallel to each other. In addition, the rear surface (second side) of the first body 200 and the rear surface (second side) of the second body 300 may be made parallel to each other.

The first body 200 is provided with a first receiving portion 207 that is open toward the front side. The first receiving portion 207 is formed on the inner end portion of the first body 200, and is open toward the second body 300 in the unfolding state.

The second body 300 is provided with a second receiving portion 307 which is open toward the front side. The second receiving portion 307 is formed on the inner end portion of the second body 300, and is open toward the first body 200 in the unfolding state.

The first link 400 is configured to connect the first body 200 and the second body 300 to each other.

The first link 400 may include a first fixed connection part 410 and a first moving connection portion 420, and the first fixed connection part 410 extends from an end portion of the first moving connection portion 420.

The first link 400 is elongated along the width direction Y, and in particular, the first moving connection portion 420 is elongated along the width direction Y. The first link 400 may be inserted inside the first receiving portion 207 and positioned between the left edge 204 and the right edge 205 of the first body, and both end portions of the first moving connection portion 420 of the first link 400 may be in close contact with or adjacent to inner surfaces of the left edge 204 and the right edge 205, respectively.

In the unfolding state, the front surface of the first moving connection portion 420 may be made parallel to the rear surface 209 of the first body 200, and may be formed to be concave when viewed from the front side, and at least a portion thereof may be formed to be concave.

The first link 400 is rotatably coupled to the second body 300 at a first fixed rotating shaft S2, and the first fixed rotating shaft S2 is coupled to the second body 300 on the first fixed connection portion 410.

The first link 400 is coupled to the first body 200 to be slidably movable and rotatable at a first moving rotating shaft S4, and the first moving rotating shaft S4 is coupled to the first body 200 on the first moving connection portion 420.

In order for the first moving rotating shaft S4 coupled to the first link 400 to slidably move on the first body 200, a first guide hole 201 may be formed in the first body 200, and the first moving rotating shaft S4 is inserted into the first guide hole 201 so as to slidably move and relatively rotate with respect to the first body 200.

The width of the first guide hole 201 may be formed to be identical to the diameter of the first moving rotating shaft S4 that is inserted into the first guide hole 201. The length of the first guide hole 201 is made to be longer than the diameter of the first moving rotating shaft S4, and may have a length such that the movement of the first moving rotating shaft S4 is not hindered when the flexible display device 1 is changed from the unfolding state to the folding state.

The first guide hole 201 may be longitudinally formed along the length direction of the first body 200, may have a curved or straight line shape, and may be formed to be parallel to the rear surface 209 of the first body 200.

The second link 500 is rotatably coupled to the first link 400 with respect to the central rotating shaft S1 such that the second link 500 intersects with the first link 400 at the central rotating shaft S1.

The second link 500 is configured to connect the second body 300 and the first body 200 to each other.

The second link 500 may include a second fixed connection portion 510 and a second moving connection portion 520, and the second fixed connection portion 510 extends from an end portion of the second moving connection portion 520.

The second link 500 is elongated along the width direction Y, and in particular, the second moving connection portion 520 is elongated along the width direction Y. The second link 500 may be inserted inside the second receiving portion 307 and positioned between the left edge 304 and the right edge 305 of the second body 300, and both end portions of the second moving connection portion 520 of the second link 500 may be in close contact with or adjacent to inner surfaces of the left edge 304 and the right edge 505, respectively.

In the unfolding state, the front surface of the second moving connection portion 520 may be made parallel to the rear surface 309 of the second body 300, and may be formed to be concave when viewed from the front side, and at least a portion thereof may be formed to be concave.

The second link 500 is rotatably coupled to the first body 200 at the second fixed rotating shaft S3. The second fixed rotating shaft S3 is located farther from the rear surface 209 of the first body 200 than the first moving rotating shaft S4. The second fixed rotating shaft S3 is coupled to the first body 200 on the second fixed connection portion 510.

The second link 500 is coupled to the second body 200 to be slidably movable and rotatable at a second moving rotating shaft S5, and the second moving rotating shaft S4 is coupled to the second body 300 on the second moving connection portion 520.

In order for the second moving rotating shaft S5 coupled to the second link 500 to slidably move on the second body 300, a second guide hole 301 may be formed in the second body 300, and the second moving rotating shaft S5 is inserted into the second guide hole 301 so as to slidably move and relatively rotate with respect to the second body 300.

The width of the second guide hole 301 may be formed to be identical to the diameter of the second moving rotating shaft S5 inserted into the second guide hole 301. The length of the second guide hole 301 is made to be longer than the diameter of the second moving rotating shaft S5, and may have a length such that the movement of the second moving rotating shaft S5 is not hindered when the flexible display device 1 is changed from the unfolding state to the folding state.

The second guide hole 301 may be longitudinally formed along the length direction of the second body 300, may have a curved or straight line shape, and may be formed to be parallel to the rear surface 309 of the second body 300.

In the hinge assembly 2 according to the embodiment of the present disclosure, in a state where the first body 200 and the second body 300 are unfolded from each other, the central rotating shaft S1 is formed to be located further frontward than the rear surfaces 209 and 309 of the first body 200 and the second body 300.

In the unfolding state, when it is assumed that the second link 500 rotates with respect to the first link 400, the second fixed rotating shaft S3 moves in a direction away from the inner end portion of the second body 300 while rotating with respect to the central rotating shaft S1, and accordingly, the first body 200 rotates while moving slightly away from the second body 300 so that rotation is performed without interference between the first body 200 and the second body 300.

Therefore, in the flexible display device 1 according to the embodiment of the present disclosure, when folding, the front surface of the first body 200 and the front surface of the second body 300 may be made to be close to or in close contact with each other, and when unfolding, the inner end portion of the first body 200 and the inner end portion of the second body 300 may made to be close to or in close contact with each other.

Further, in accordance with the above, in the unfolding state of the first body 200 and the second body 300, the first link 400 and the second link 500 may form a hinge assembly 2 which is not exposed at the rear surfaces 209 and 309 of the first body 200 and the second body 300. In addition, in the unfolding state, the flexible display device 1 in which the first link 400 and the second link 500 are not exposed may be provided.

As described above, in the hinge assembly 2 according to this embodiment of the present disclosure, portions of the first link 400 and the second link 500 may be received in the first receiving portion 207 of the first body 200, and in addition, portions of the first link 400 and the second link 500 may be received in the second receiving portion 307 of the second body 300.

Further, end portions of each of the first fixed rotating shaft S2 and the second moving rotating shaft S5 may be coupled to either one or both edges 304 and 305 of the second body 300, and end portions of the second fixed rotating shaft S3 and the first moving rotating shaft S4 may be coupled to either one or both edges 204 and 205 of the first body 200.

For example, end portions of each of the first fixed rotating shaft S2 and the second moving rotating shaft S5 may be coupled through the edges 304 and 305 of the second body 300, and end portions of the second fixed rotating shaft S3 and the first moving rotating shaft S4 may be coupled through the edges 204 and 205 of the first body 200.

In such a way, in the hinge assembly 2 according to this embodiment of the present disclosure, the first link 400 and the second link 500 are provided inside the first receiving portion 207 of the first body 200 and the second receiving portion 307 of the second body 300, and are made to connect with the first body 200 and the second body 300. Accordingly, folding and unfolding of the first body 200 and the second body 300 may be smoothly performed without increasing the width of the bezel portion of the flexible display device 1.

In the hinge assembly 2 according to this embodiment of the present disclosure, the first moving rotating shaft S4 may be made to be closer to the rear surface 209 of the first body 200 than the central rotating shaft S1 or the same distance from the rear surface 209 of the first body 200 as the central rotating shaft S1, and the second moving rotating shaft S5 may be made to be closer to the rear surface 309 of the second body 300 than the central rotating shaft S1 or the same distance from the rear surface 309 of the second body 300 as the central rotating shaft S1.

In the hinge assembly 2 according to this embodiment of the present disclosure, the distance from the central rotating shaft S1 to the first moving rotating shaft S4 is longer than the distance from the central rotating shaft S1 to the second fixed rotating shaft S3. In addition, the distance from the central rotating shaft S1 to the second moving rotating shaft S5 is made to be longer than the distance from the central rotating shaft S1 to the first fixed rotating shaft S2.

In addition, in a state where the first body 200 and the second body 300 are unfolded (unfolding state), an angle between the line connecting the central rotating shaft Si at the second fixed rotating shaft S3 and the line connecting the first moving rotating shaft S4 at the second fixed rotating shaft S3 is greater than 90°.

In addition, in a state where the first body 200 and the second body 300 are unfolded (unfolding state), an angle between the line connecting the central rotating shaft Si at the first fixed rotating shaft S2 and the line connecting the second moving rotating shaft S5 at the first fixed rotating shaft S2 is greater than 90°.

In the hinge assembly 2 according to the embodiment of the present disclosure, in a state where the first body 200 and the second body 300 are unfolded (unfolding state), the distance from the second fixed rotating shaft S3 to the central rotating shaft S1 may be shorter than the distance from the second fixed rotating shaft S3 to the first moving rotating shaft S4.

In addition, in a state where the first body 200 and the second body 300 are unfolded (unfolding state), the distance from the first fixed rotating shaft S2 to the central rotating shaft S1 may be shorter than the distance from the first fixed rotating shaft S2 to the second moving rotating shaft S5.

In the hinge assembly 2 according to the embodiment of the present disclosure, in a state where the first body 200 and the second body 300 are unfolded (unfolding state), the angle between the line connecting the central rotating shaft S1 and the first moving rotating shaft S4 and the line connecting the central rotating shaft S1 and the second fixed rotating shaft S3 may be an arbitrary angle of 30° to 50°, and the angle between the line connecting the central rotating shaft S1 and the second moving rotating shaft S5 and the line connecting the central rotating shaft S1 and the first fixed rotating shaft S2 may be an arbitrary angle of 30° to 50°.

In the unfolding state, when the second fixed rotating shaft S3 rotates with respect to the central rotating shaft S1, the second fixed rotating shaft S3 approaches toward the first moving connection portion 420, and the second fixed rotating shaft S3 may be in contact with the first moving connection portion 420. At this time, a concave first seating groove into which the second fixed rotating shaft S3 is inserted may be formed in the first moving connection portion 420.

In addition, in the unfolding state, when the first fixed rotating shaft S2 rotates with respect to the central rotating shaft S1, the first fixed rotating shaft S2 approaches toward the second moving connection portion 520, and the first fixed rotating shaft S2 may be in contact with the second moving connection portion 520. At this time, a concave second seating groove into which the first fixed rotating shaft S2 is inserted may be formed in the second moving connection portion 520.

In the hinge assembly 2 according to the embodiment of the present disclosure, when looking in the axial direction of the central rotating shaft S1, the first link 400 and the second link 500 may be formed to be symmetrical to each other.

In the unfolding state, the first display portion 11, the second display portion 12, and the folding portion 13 of the flexible display 10 are all spread flat, and are placed on the front surface of the first body 200 and the second body 300.

In the hinge assembly 2 according to the embodiment of the present disclosure, in the unfolding state, the first link 400 and the second link 500 are provided inside the first body 200 and the second body 300. When transitioning from the unfolding state to the folded (in-folding) state, since the folding portion 13 of the flexible display 10 is bent and moves toward the rear surfaces 209 and 309 of the first body 200 and the second body 300, at this time, the first link 400 and the second link 500 need to be made so as not to interfere with the folding portion 13 of the flexible display 10.

In the hinge assembly 2 according to the embodiment of the present disclosure, when the first fixed rotating shaft S2 rotates with respect to the central rotating shaft S1, the first fixed rotating shaft S2 may rotate until it contacts the second moving connection portion 520. When the second fixed rotating shaft S3 rotates based on the central rotating shaft S1, the second fixed rotating shaft S3 may rotate until it contacts the first moving connection portion 420.

Therefore, the rotation angle range of the first fixed rotating shaft S2 with respect to the central rotating shaft S1 and the rotation angle range of the second fixed rotating shaft S3 with respect to the central rotating shaft S1 are secured, and relative rotation between the first link 400 and the second link 500 may be made sufficiently. The first moving rotating shaft S4 may move along the first guide hole 201 and move closer to the inner end portion of the first body 200, and the second moving rotating shaft S5 may move toward the inner end portion of the second body 300 while moving along the second guide hole 301.

In an embodiment of the present disclosure, when looking in the axial direction of the central rotating shaft S1, the first link 400 and the second link 500 are symmetrical with each other in an unfolding state, and when a maximum rotation angle of the second fixed rotating shaft S3 based on the point where the central rotating shaft S1 is located in the first link 400 when transitioning from the unfolding state to a folding state is referred to as θ1 (see FIGS. 8A and 8B) and a maximum rotation angle of the first body 200 based on the first link 400 when transitioning from the unfolding state to the folding state is referred to as θ2 (see FIGS. 7A and 7B), a hinge assembly 2 may be made to satisfy the following Equation 1:

$$\theta 1 + 2*\theta 2 = 180°$$ Equation 1:

As made in such a way, in the unfolding state, the rear surface 209 of the first body 200 and the rear surface 209 of the second body 300 may form the same plane, and in the folding state, the rear surface 209 of the first body 200 and the rear surface 309 of the second body 300 may be parallel to each other, and the first body 200 and the second body 300 may be in close contact with each other.

In addition, as described above, by the hinge assembly 2 and the flexible display device 1 according to this embodiment of the present disclosure, in a state where the first body 200 and the second body 300 are unfolded (unfolding state), the first link 400 and the second link 500 may more easily form the hinge assembly 2 which is not exposed at the rear surfaces 209 and 309 of the first body 200 and the second body 300. Further, the rotation angle range of the first fixed rotating shaft S2 with respect to the central rotating shaft S1 and the rotation angle range of the second fixed rotating shaft S3 with respect to the central rotating shaft S1 are secured, such that in a state where the first body 200 and the second body 300 are folded (folding state), it is possible to easily secure a space in which the folding portion 13 of the flexible display 10 may be placed in the inner spaces of the first body 200 and the second body 300. In addition, the first link 400 and the second link 500 may shield portions of the inner end portions of the first body 200 and the second body 300 to prevent the flexible display 10 from being exposed.

The hinge assembly 2 according to an embodiment of the present disclosure may further include a third link 210, a fourth link 310, a first support plate 220, and a second support plate 320.

When the hinge assembly 2 is viewed from the front side, the third link 210, the fourth link 310, the first support plate 220, and the second support plate 320 may be formed in a symmetrical form, and the third link 210 and the fourth link 310 may be formed in plurality.

The third link 210 is rotatably coupled to the first link 400 at the first moving rotating shaft S4.

The first support plate 220 is rotatably coupled to the third link 210 at the third moving rotating shaft S6 farther from the central rotating shaft S1 than the first moving rotating shaft S4, and is slidably and rotatably coupled to the first body 200 at a fourth moving rotating shaft S7 farther from the central rotating shaft S1 than the third moving rotating shaft S6.

The first support plate 220 is made long along the width direction Y. The first support plate 220 may be inserted into the first receiving portion 207, and positioned between the left edge 204 and the right edge 205 of the first body, and both end portions of the first support plate 220 may be in close contact with or close to inner surfaces of the left edge 204 and the right edge 205, respectively.

In the folding state where the first body 200 and the second body 300 are folded into each other, the third moving rotating shaft S6 is closer to the rear surface 209 of the first body 200 than the fourth moving rotating shaft S7, and when the first body 200 and the second body 300 are unfolded from each other, the third moving rotating shaft S6 is made to become farther away from the rear surface 209 of the first body 200. In an unfolding state where the first body 200 and the second body 300 are unfolded from each other, the distance from the rear surface of the first body 200 to the third moving rotating shaft S6 may be made to be identical to the distance from the rear surface 209 of the first body 200 to the fourth moving rotating shaft S7.

Further, in the unfolding state, the front surface of the first support plate 220 may be made to be entirely flat, may be made parallel to the front surface of the first body 200, and may form the same plane as the front surface of the first body 200.

In order for the third moving rotating shaft S6 to slide on the first body 200 along a predetermined path, a third guide hole 202 may be formed in the first body 200, and the third moving rotating shaft S6 is inserted into the third guide hole 202 and slidably moves and relatively rotates with respect to the first body 200.

The width of the third guide hole 202 may be formed to be identical to the diameter of the third moving rotating shaft S6 inserted into the third guide hole 202. The length of the third guide hole 202 is made to be longer than the diameter of the third moving rotating shaft S6, and may have a length such that the movement of the third moving rotating shaft S5 is not hindered when the flexible display device 1 is changed from the unfolding state to the folding state.

The third guide hole 202 is longitudinally formed in a direction in which it becomes farther away from the rear surface 209 of the first body 200 the farther away it becomes from the inner end portion of the first body 200, and the overall forming direction of the third guide hole 202 is inclined relative to the rear surface 209 of the first body 200. The third guide hole 202 may be formed in a curved or straight line shape.

In order for the fourth moving rotating shaft S7 to slide on the first body 200, a fourth guide hole 203 may be formed in the first body 200, and the fourth moving rotating shaft S7 is inserted into the fourth guide hole 203 and slidably moves and relatively rotates with respect to the first body 203.

The width of the fourth guide hole 203 may be formed to be identical to the diameter of the fourth moving rotating shaft S7 inserted into the fourth guide hole 203. The length of the fourth guide hole 203 is made to be longer than the diameter of the fourth moving rotating shaft S7, and may have a length such that the movement of the fourth moving rotating shaft S7 is not hindered when the flexible display device 1 is changed from the unfolding state to the folding state.

The fourth guide hole 203 may be longitudinally formed along the length direction of the first body 200, may have a curved or straight line shape, and may be formed to be parallel to the rear surface 209 of the first body 200.

The fourth link 310 is rotatably coupled to the second link 500 at the second moving rotating shaft S5.

The second support plate 320 is rotatably coupled to the fourth link 310 at the fifth moving rotating shaft S8 farther from the central rotating shaft S1 than the second moving rotating shaft S5, and is slidably and rotatably coupled to the second body 300 at a sixth moving rotating shaft S9 farther from the central rotating shaft S1 than the fifth moving rotating shaft S8.

The second support plate 320 is made long along the width direction Y. The second support plate 320 may be inserted into the second receiving portion 307 and positioned between the left edge 304 and the right edge 305 of the second body, and both end portions of the second support plate 320 may be in close contact with or close to inner surfaces of the left edge 304 and the right edge 305, respectively.

In the folding state where the first body 200 and the second body 300 are folded into each other, the fifth moving rotating shaft S8 is closer to the rear surface 309 of the second body 300 than the sixth moving rotating shaft S9, and when the first body 300 and the second body 300 are unfolded from each other, the fifth moving rotating shaft S8 is made to be made to become farther away from the rear surface 309 of the second body 300. In an unfolding state where the first body 200 and the second body 300 are unfolded from each other, the distance from the rear surface 309 of the second body 300 to the fifth moving rotating shaft S8 may be made to be identical to the distance from the rear surface 309 of the second body 300 to the sixth moving rotating shaft S9.

Further, in the unfolding state, the front surface of the second support plate 320 may be made to be entirely flat, may be made parallel to the front surface of the second body 300, and may form the same plane as the front surface of the second body 300.

In order for the fifth moving rotating shaft S6 to slide on the second body 300 along a predetermined path, a fifth guide hole 302 may be formed in the second body 300, and the fifth moving rotating shaft S8 is inserted into the fifth guide hole 302 and slidably moves and relatively rotates with respect to the second body 300.

The width of the fifth guide hole 302 may be formed to be identical to the diameter of the fifth moving rotating shaft S8 inserted into the fifth guide hole 302. The length of the fifth guide hole 302 is made to be longer than the diameter of the fifth moving rotating shaft S8, and may have a length such that the movement of the fifth moving rotating shaft S8 is not hindered when the flexible display device 1 is changed from the unfolding state to the folding state.

The fifth guide hole 302 is longitudinally formed in a direction in which it becomes farther away from the rear surface 309 of the second body 300, and the overall forming direction of the fifth guide hole 302 is inclined relative to the rear surface 309 of the second body 300. The fifth guide hole 302 may be formed in a curved or straight line shape.

In order for the sixth moving rotating shaft S9 to slide on the second body 300, a sixth guide hole 303 may be formed in the second body 300, and the sixth moving rotating shaft S9 is inserted into the sixth guide hole 303 and slidably moves and relatively rotates with respect to the second body 300.

The width of the sixth guide hole 303 may be formed to be identical to the diameter of the sixth moving rotating shaft S9 inserted. The length of the sixth guide hole 303 is made to be longer than the diameter of the sixth moving rotating shaft S9, and may have a length such that the movement of the sixth moving rotating shaft S9 is not hindered when the flexible display device 1 is changed from the unfolding state to the folding state.

The sixth guide hole 303 may be longitudinally formed along the length direction of the second body 300, may have a curved or straight line shape, and may be formed to be parallel to the rear surface 309 of the second body 300.

By the hinge assembly 2 and the display device 1 according to this embodiment of the present disclosure made as described above, in the unfolding state, the first support plate 220 and the second support plate 320 may support the flexible display 10, and in particular, may support the flexible display while being coplanar with the front surface of the first body 200 and the front surface of the second body 300.

In addition, during the process of the transition from the unfolding state to the folding state, the first support plate 220 and the second support plate 320 move while operating in conjunction with the first link 400 and the second link 500. In the folding state, as the third moving rotating shaft S6 approaches the rear surface 209 of the first body 200, the first support plate 220 is positioned in an inclined form relative to the first body 200, and as the fifth moving rotating shaft S8 approaches the rear surface 309 of the second body 300, the second support plate 320 is positioned in an inclined form relative to the second body 300.

Thus, in the folding state, the first support plate 220 and the second support plate 320 may be prevented from interfering with the folding portion 13 of the flexible display 10. In addition, the first support plate 220 and the second support plate 320 are disposed in a form surrounding the flexible display 10 together with the first link 400 and the second link 500 such that the flexible display 10 may be protected.

In the hinge assembly 2 and the display device 1 according to this embodiment of the present disclosure, the third link 210 and the first support plate 220 may be provided inside the first receiving portion 207 of the first body 200, and in addition, the fourth link 310 and the second support plate 320 may be provided inside the second receiving portion 307 of the second body 300.

Further, end portions of each of the third moving rotating shaft S6 and the fourth moving rotating shaft S7 may be coupled to both edges 204 and 205 of the first body 200, and end portions of each of the fifth moving rotating shaft S8 and the sixth moving rotating shaft S9 may be coupled to both edges 304 and 305 of the second body 300.

For example, end portions of each of the third moving rotating shaft S6 and the fourth moving rotating shaft S7 may be coupled through both edges 204 and 205 of the first body 200, and end portions of each of the fifth moving rotating shaft S8 and the sixth moving rotating shaft S9 may be coupled through both edges 304 and 305 of the second body 300.

In such a way, in the hinge assembly 2 according to the embodiment of the present disclosure, the third link 210, the fourth link 310, the first support plate 220, and the second support plate 320 are provided in the first receiving portion 207 of the first body 200 and the second receiving portion 307 of the second body 300, and are made to move while operating in conjunction with the first link 400 and the second link 500. Accordingly, transition between folding and unfolding may be performed smoothly without increasing the width of the bezel portion of the flexible display device 1.

FIG. 9 is a view illustrating a portion of a cross-section of a portion of the second body 300 in the flexible display device 1 according to an embodiment of the present disclosure. FIG. 10 is a perspective view illustrating some components of the flexible display device 1 according to an embodiment of the present disclosure. FIG. 11A is a longitudinal cross-sectional view of a portion of the second body 300 when the flexible display device 1 is in a folding state according to an embodiment of the present disclosure. FIG. 11B is a longitudinal cross-sectional view of a portion of the second body 300 when the flexible display device 1 is in an unfolding state according to an embodiment of the present disclosure.

The hinge assembly 2 and the display device 1 according to the embodiment of the present disclosure may include a sliding plate 330, a connection body 340, and an elastic body 350.

When the hinge assembly 2 is viewed from the front side, the sliding plate 330, the connection body 340, and the elastic body 350 may be formed in a symmetrical form, and the connection body 340 and the elastic body 350 may be formed in plurality.

The sliding plate 330 is made to support the flexible display 10, and is slidably coupled to the second body 300.

The sliding plate 330 may have a width corresponding to the width of the flexible display 10, and may have a width that is the same as or larger than the width of the flexible display 10.

In the hinge assembly 2 and the display device 1 according to this embodiment of the present disclosure, when the sliding plate 330 is included, the second display portion 12 of the flexible display 10 is coupled to the sliding plate 330, and not directly coupled to the second body 300. That is, the second display portion 12 is coupled to the second body 300 using the sliding plate 330 as a medium.

The sliding plate 330 is slidably coupled along the length direction of the second body 300, and is reciprocated in the second body 300. Therefore, when the sliding plate 330 moves along the length direction of the second body 300 with respect to the second body 300, the second display portion 12 also moves along the length direction of the second body 300.

In the hinge assembly 2 and the display device 1 according to the embodiment of the present disclosure, concave slide grooves 306 may be formed in both edges 304 and 305 of the second body 300 in the length direction.

A slide protrusion 332 inserted into the slide groove 306 may be formed at both edges of the sliding plate 330.

Accordingly, both slide protrusions 332 of the sliding plate 330 may respectively be inserted into the slide grooves 306 and move, and stable slide movement of the sliding plate 330 against the second body 300 may be performed.

Further, in order to allow the movement of the sliding plate 330 based on the second body 300, a sliding space is provided between edges that form the outer end portion of the sliding plate 330 and the outer end portion of the second body 300.

The sliding plate 330 may have a front surface parallel to the rear surface 309 of the second body 300.

The connection body 340 may be connected to the second moving rotating shaft S5 such that the connection body 340 can move closer to or farther from the sliding plate 330. At this time, the connection body 340 may not be directly connected to the second moving rotating shaft S5, or may be connected to the second moving rotating shaft S5 through other means.

In a specific embodiment of the present disclosure, the connection body 340 may be connected to the sixth moving rotating shaft S9 such that the connection body 340 can move closer to or farther from the sliding plate 330.

The connection body 340 is located closer to the inner end portion of the second body 300 than the sliding plate 330.

The elastic body 350 is made to provide an elastic force to the sliding plate 330 in a direction away from the connection body 340. The elastic body 350 may be formed in the form of a conventional coil spring. When an external force is applied, the elastic body 350 may be compressed in the length direction and store the elastic force, and may be elastically recovered when the external force is removed.

In an embodiment of the present disclosure, an insertion groove 331 may be formed in the sliding plate 330 that is inserted while the connection body 340 slides, and the elastic body 350 may be made to be elastically changed in a state of being received in the insertion groove 331.

In the folding state, the folding portion 13 of the flexible display 10 is in a bent state.

When the transition is made from the folding state to the unfolding state, the flexible display 10 is unfolded, and at this time, in order to maintain the flat state of the flexible display 10, a tensile force needs to be applied to the flexible display.

In an embodiment of the present disclosure, when the transition is made from the folding state to the unfolding state, the second support plate 320 moves toward the outer end portion of the second body 300, and thus the connection body 340 moves toward the outer end portion of the second body 300.

The connection body 340 presses the elastic body 350, and the elastic body 350 presses the sliding plate 330. Accordingly, the sliding plate 330 is moved toward the outer end portion from the second body 300.

Therefore, the second display portion 12 coupled to the sliding plate 330 may be pulled away from the first display portion 11, and the flexible display 10 may be unfolded to be flat while the tensile force is applied to the flexible display 10 as a whole.

At this time (unfolding state), the sliding space 308 may be in a narrowest state, and the outer end portion of the sliding plate 330 and the outer edge of the second body 300 are very close to each other.

In addition, at this time, the tensile force acting on the flexible display 10 may be adjusted to a degree that does not affect the flexible display 10, and the adjustment of the tensile force may be made by adjusting the elastic force of the elastic body 350 to be compressed.

As described above, by the hinge assembly 2 and the flexible display device 1 according to the embodiment of the present disclosure, a tensile force may be applied to the flexible display 10 by the connection body 340, the elastic body 350, and the sliding plate 330 moving while operating in conjunction with the second support plate 320, and in the unfolding state, the whole flexible display 10 may be kept flat.

Further, the movement of the connection body 340, the elastic body 350, and the sliding plate 330 may be made to operate in conjunction with the movement of the first link 400, the second link 500, the fourth link 310, and the second support plate 320.

Further, by the hinge assembly 2 and the flexible display device 1 according to this embodiment of the present disclosure, when transitioning from the unfolding state to the folding state, the connection body 340 moves in a direction away from the sliding plate 330, and as the elastic body 350 elastically recovers, the elastic force stored in the elastic body 350 may decrease or become zero.

At this time (folding state), the sliding space 308 may be in a widest state, and the outer end portion of the sliding plate 330 and the outer edge of the second body 300 are further spaced apart from each other as compared with the unfolding state.

Accordingly, in the folding state, the shear force generated between the surfaces where the flexible display 10 (the second display portion 12) and the sliding plate 330 are coupled may be significantly reduced as compared with the unfolding state. Furthermore, the shear force may not be generated between the surfaces where the flexible display 10 (the second display portion 12) and the sliding plate 330 are coupled.

Therefore, by the hinge assembly 2 and the flexible display device 1 according to this embodiment of the present disclosure, it is possible to prevent the sliding plate 330 from applying an excessive load on the flexible display 10 in the folding state, and to prevent the flexible display 10 from being damaged.

In relation to the flexible display device according to an embodiment of the present disclosure, industrial applicability is remarkable in that the first link and the second link do not protrude to the outside of the first body and the second body in the unfolding state, the first link and the second link may be changed in a form that may protect the flexible display when folding, the flexible display is pulled tight in the unfolding state, and an excessive load on the flexible display may be prevented in the folding state.

In the foregoing, while specific embodiments of the present disclosure have been described for illustrative purposes, the scope or spirit of the present disclosure is not limited thereto, it will be understood by those skilled in the art that various changes and modifications may be made to other specific embodiments without departing from the spirit and scope of the present disclosure. Therefore, the scope of the present disclosure should be defined not by the above-described embodiments but by the technical idea defined in the following claims.

What is claimed is:

1. A device, comprising:
   a flexible display, wherein the flexible display is located at a first side of the device;
   a first body and a second body configured to be movable with respect to each other in a frontward direction between a first state and a second state, wherein the first state corresponds to the first body and the second body being unfolded from each other and the second state corresponds to the first body and the second body being folded into each other;
   a first link rotatably coupled to the second body at a first fixed rotating shaft, and slidably and rotatably coupled to the first body at a first moving rotating shaft; and
   a second link rotatably coupled to the first link with respect to a central rotating shaft, rotatably coupled to the first body at a second fixed rotating shaft, and slidably and rotatably coupled to the second body at a second moving rotating shaft, wherein in the first state:
   the second link intersects with the first link at the central rotating shaft,
   the second fixed rotating shaft is farther from a second side of the first body than the first moving rotating shaft,
   the second moving rotating shaft is closer to the second side of the second body than the first fixed rotating shaft, and
   the central rotating shaft is located further frontward than the second side of the first body and the second body.

2. The device of claim 1, wherein
   the first body includes a first receiving portion that is open toward the first side and configured to accommodate a portion of the first link and the second link,
   the second body includes a second receiving portion that is open toward the first side and configured to accommodate a portion of the first link and the second link,
   a first end portion of each of the first fixed rotating shaft and the second moving rotating shaft are respectively coupled to corresponding opposing edges of the second body, and
   a second end portion of each of the second fixed rotating shaft and the first moving rotating shaft are respectively coupled to corresponding opposing edges of the first body.

3. The device of claim 1, wherein in the first state:
   the first moving rotating shaft is closer to the second side of the first body than the central rotating shaft or a same distance from the second side of the first body as the central rotating shaft, and the second moving rotating shaft is closer to the second side of the second body than the central rotating shaft or a same distance from the second side of the second body as the central rotating shaft.

4. The device of claim 1, wherein the first link and the second link are symmetrical when viewed from an axial direction of the central rotating shaft, and
   wherein in the first state: a distance from the second fixed rotating shaft to the central rotating shaft is shorter than a distance from the second fixed rotating shaft to the first moving rotating shaft.

5. The device of claim 1, wherein the first link and the second link are symmetrical when viewed from an axial direction of the central rotating shaft in the first state, and when a maximum rotation angle of the second link with respect to a position of the central rotating shaft in the first link when the first body and the second body moves from the first state to the second state is defined as θ1 and a maximum rotation angle of the first body with respect to the position of the central rotating shaft in the first link when the first body and the second body moves from the first state to the second state is defined as θ2 such that a following equation is satisfied:

$$\theta 1 + 2*\theta 2 = 180°.$$

6. The device of claim 1, further comprising:
   a third link rotatably coupled to the first link at the first moving rotating shaft;
   a fourth link rotatably coupled to the second link at the second moving rotating shaft;
   a first support plate rotatably coupled to the third link at a third moving rotating shaft that is farther from the central rotating shaft than the first moving rotating shaft, wherein the first support plate is slidably and rotatably coupled to the first body at a fourth moving rotating shaft that is farther from the central rotating shaft than the third moving rotating shaft; and
   a second support plate rotatably coupled to the fourth link at a fifth moving rotating shaft that is farther from the central rotating shaft than the second moving rotating shaft, wherein the second support plate is slidably and rotatably coupled to the second body at a sixth moving rotating shaft that is farther from the central rotating shaft than the fifth moving rotating shaft,
   wherein in the second state:
      the third moving rotating shaft is closer to the second side of the first body than the fourth moving rotating shaft, and
      the fifth moving rotating shaft is closer to the second side of the second body than the sixth moving rotating shaft, and
   wherein in the first state:
      a distance from the second side of the first body to the third moving rotating shaft is a same distance from the second side of the first body to the fourth moving rotating shaft, and
      a distance from the second side of the second body to the fifth moving rotating shaft is a same distance from the second side of the second body to the sixth moving rotating shaft.

7. The device of claim 6, further comprising:
   a sliding plate configured to support the flexible display, and slidably coupled to the second body;

a connection body connected to the sixth moving rotating shaft so as to move the connection body closer to or away from the sliding plate; and an elastic body configured to provide an elastic force to the sliding plate in a direction away from the connection body.

8. The device of claim 7, wherein the sliding plate comprises an insertion groove that is configured to receive the connection body therein, wherein the elastic body is positioned in the insertion groove.

9. The device of claim 7, wherein the second body comprises a concave slide groove formed along each length direction of corresponding opposing edges of the second body, wherein the sliding plate comprises a slide protrusion formed at corresponding opposing edges of the sliding plate, wherein the slide protrusion is inserted into the concave slide groove.

10. The device of claim 1, further comprising:
a sliding plate configured to support the flexible display, and slidably coupled to the second body;
a connection body connected to the second moving rotating shaft so as to move the connection body closer to or away from the sliding plate; and
an elastic body configured to provide an elastic force to the sliding plate in a direction away from the connection body.

11. The device of claim 10, wherein the sliding plate comprises an insertion groove that is configured to receive the connection body therein, wherein the elastic body is positioned in the insertion groove.

12. The device of claim 10, wherein the second body comprises a concave slide groove formed along each length direction of corresponding opposing edges of the second body, wherein the sliding plate comprises a slide protrusion formed at corresponding opposing edges of the sliding plate, wherein the slide protrusion is inserted into the concave slide groove.

13. A device, comprising:
a flexible display, wherein the flexible display is located at a first side of the device;
a first body and a second body configured to be movable with respect to each other in a frontward direction between a first state and a second state, wherein the first state corresponds to the first body and the second body being unfolded from each other and the second state corresponds to the first body and the second body being folded into each other;
a first link rotatably coupled to the second body at a first fixed rotating shaft, and slidably and rotatably coupled to the first body at a first moving rotating shaft; and
a second link rotatably coupled to the first link with respect to a central rotating shaft, rotatably coupled to the first body at a second fixed rotating shaft, and slidably and rotatably coupled to the second body at a second moving rotating shaft, wherein in the first state:
the second link intersects with the first link at the central rotating shaft,
the second fixed rotating shaft is farther from a second side of the first body than the first moving rotating shaft, and
the second moving rotating shaft is closer to the second side of the second body than the first fixed rotating shaft;
a sliding plate configured to support the flexible display, and slidably coupled to the second body;
a connection body connected to the second moving rotating shaft so as to move the connection body closer to or away from the sliding plate; and
an elastic body configured to provide an elastic force to the sliding plate in a direction away from the connection body.

14. The device of claim 13, wherein the sliding plate comprises an insertion groove that is configured to receive the connection body therein, wherein the elastic body is positioned in the insertion groove.

15. The device of claim 13, wherein the second body comprises a concave slide groove formed along each length direction of corresponding opposing edges of the second body, wherein the sliding plate comprises a slide protrusion formed at corresponding opposing edges of the sliding plate, wherein the slide protrusion is inserted into the concave slide groove.

* * * * *